United States Patent
Itagaki et al.

(10) Patent No.: US 10,696,861 B2
(45) Date of Patent: Jun. 30, 2020

(54) ACTINIC-RAY-CURABLE RESIN COMPOSITION, LAYERED FILM INCLUDING HARDCOAT FORMED THEREFROM, AND LAYERED TRANSPARENT RESIN PRODUCT

(71) Applicant: RIKEN TECHNOS CORPORATION, Tokyo (JP)

(72) Inventors: Yasuhiro Itagaki, Tokyo (JP); Shigekazu Ito, Tokyo (JP)

(73) Assignee: RIKEN TECHNOS CORPORATION (JP)

( * ) Notice: Subject to any disclaimer, the term of this patent is extended or adjusted under 35 U.S.C. 154(b) by 0 days.

(21) Appl. No.: 16/529,103

(22) Filed: Aug. 1, 2019

(65) Prior Publication Data

US 2019/0352531 A1 Nov. 21, 2019

Related U.S. Application Data

(62) Division of application No. 15/315,267, filed as application No. PCT/JP2015/060820 on Apr. 7, 2015, now Pat. No. 10,407,590.

(30) Foreign Application Priority Data

May 30, 2014 (JP) .................................. 2014-112034
Jun. 16, 2014 (JP) .................................. 2014-123031

(51) Int. Cl.
*B32B 27/30* (2006.01)
*B32B 27/36* (2006.01)
(Continued)

(52) U.S. Cl.
CPC ............ *C09D 135/02* (2013.01); *B32B 27/18* (2013.01); *B32B 27/20* (2013.01); *B32B 27/30* (2013.01);
(Continued)

(58) Field of Classification Search
CPC ................................................ B32B 2307/412
See application file for complete search history.

(56) References Cited

U.S. PATENT DOCUMENTS 4,753,827 A 6/1988 Yoldas
4,982,014 A 1/1991 Freitag et al.
(Continued)

FOREIGN PATENT DOCUMENTS

CN 1089627 A 7/1994
EP 2733156 A1 5/2014
(Continued)

OTHER PUBLICATIONS

Computer-generated English-language translation of JP2009279806A.*
(Continued)

*Primary Examiner* — Vu A Nguyen
(74) *Attorney, Agent, or Firm* — Bracewell LLP; Brad Y. Chin

(57) ABSTRACT

Embodiments relate to a hard coat-laminated film for a touch panel display face plate, the hard coat-laminated film including: a transparent resin film, and a hard coat formed on at least one surface of the transparent resin film from a coating material including an active energy ray-curable resin composition. The hard coat-laminated film meets the following requirements (1-i) to (1-v): (1-i) a total light transmittance of 80% or higher, (1-ii) a haze of 3.0% or lower, (1-iii) a yellowness index of 3 or lower, (1-iv) a water contact angle of a touch surface of 100° or larger; and (1-v) a water contact angle of the touch surface of 100° or larger after 20,000-times reciprocal cotton wiping of the touch panel.

12 Claims, 1 Drawing Sheet

(51) Int. Cl.
*G02B 1/14* (2015.01)
*G02B 1/18* (2015.01)
*C09D 135/02* (2006.01)
*B32B 27/18* (2006.01)
*B32B 27/20* (2006.01)
*G02B 1/10* (2015.01)
*C08F 2/44* (2006.01)
*C08F 290/06* (2006.01)
*C08F 290/14* (2006.01)
*C08J 7/04* (2020.01)
*C09D 135/00* (2006.01)
*C08K 3/36* (2006.01)
*C08L 35/02* (2006.01)

(52) U.S. Cl.
CPC ............ *B32B 27/36* (2013.01); *B32B 27/365* (2013.01); *C08F 2/44* (2013.01); *C08F 290/06* (2013.01); *C08F 290/14* (2013.01); *C08J 7/04* (2013.01); *C08J 7/042* (2013.01); *C08J 7/0427* (2020.01); *C08K 3/36* (2013.01); *C08L 35/02* (2013.01); *C09D 135/00* (2013.01); *G02B 1/10* (2013.01); *B32B 2307/412* (2013.01); *C08J 2300/12* (2013.01); *C08J 2435/02* (2013.01)

(56) References Cited

U.S. PATENT DOCUMENTS

| | | | |
|---|---|---|---|
| 5,126,428 | A | 6/1992 | Freitag et al. |
| 5,227,458 | A | 7/1993 | Freitag et al. |
| 5,565,501 | A | 10/1996 | Hosokawa et al. |
| 7,439,279 | B2 | 10/2008 | Kondo et al. |
| 9,149,962 | B2 | 10/2015 | Saito et al. |
| 10,112,369 | B2 * | 10/2018 | Nakashima ............. B32B 27/08 |
| 2006/0070551 | A1 | 4/2006 | Kanamori et al. |
| 2010/0147191 | A1 | 6/2010 | Sakano et al. |
| 2013/0224462 | A1 | 8/2013 | Van Der Mee et al. |
| 2014/0092041 | A1 | 4/2014 | Ih |
| 2014/0106148 | A1 | 4/2014 | Kanzler et al. |
| 2014/0248478 | A1 | 9/2014 | Saito et al. |
| 2016/0159995 | A1* | 6/2016 | Nakashima ............. B29C 48/30 428/355 CN |

FOREIGN PATENT DOCUMENTS

| | | | |
|---|---|---|---|
| JP | H0314880 | A | 1/1991 |
| JP | H03005761 | A | 1/1991 |
| JP | H0671826 | A | 3/1993 |
| JP | H06107951 | A | 4/1994 |
| JP | H08224823 | A | 9/1996 |
| JP | H11255923 | A | 9/1999 |
| JP | 20033291274 | A | 10/2003 |
| JP | 2004122429 | A | 4/2004 |
| JP | 2004346228 | A | 12/2004 |
| JP | 2005112900 | A | 4/2005 |
| JP | 2005126453 | A | 5/2005 |
| JP | 2005179613 | A | 7/2005 |
| JP | 2005307158 | A | 11/2005 |
| JP | 2006337492 | A | 12/2006 |
| JP | 2008095064 | A | 4/2008 |
| JP | 2008138084 | A | 6/2008 |
| JP | 2009161744 | A | 7/2009 |
| JP | 2009279806 | A | 12/2009 |
| JP | 2009279806 | A * | 12/2009 |
| JP | 2010031162 | A | 2/2010 |
| JP | 2010138112 | A | 6/2010 |
| JP | 2010275385 | A | 12/2010 |
| JP | 2010284840 | A | 12/2010 |
| JP | 2011131407 | A | 7/2011 |
| JP | 2012048185 | A | 3/2012 |
| JP | 2012133314 | A | 7/2012 |
| JP | 2013208896 | A | 10/2013 |
| JP | 5339775 | B2 | 11/2013 |
| JP | 2014040017 | A | 3/2014 |
| JP | 2014043101 | A | 8/2014 |
| JP | 2014149520 | A | 8/2014 |
| JP | 2016020087 | A | 2/2016 |
| KR | 920004191 | B1 | 5/1992 |
| WO | 2013061428 | A1 | 5/2013 |
| WO | 2015005049 | A1 | 1/2015 |
| WO | 2015040931 | A1 | 3/2015 |

OTHER PUBLICATIONS

JP2015-200675 Office Action dated Jul. 24, 2019, 6 pgs.
EP15800072.9 Search Report dated Nov. 24, 2017; 8 pgs.
JP2014-259555 Office Action dated Jul. 10, 2018; 10 pgs.
JP2015-062019 Office Action dated Apr. 25, 2017, 9 pgs.
KR10-2016-7033592 Office Action dated Nov. 1, 2017; 34 pgs.
PCT/JP2015/060820 International Search Report dated Jul. 7, 2015; 2 pgs.
PCT/JP2015/075797 International Search Report dated Dec. 15, 2015; 2 pgs.
TW104138495 Office Action dated Apr. 11, 2019; 9 pgs.
JP2010-031162 Office Action dated Nov. 1, 2019, 9 pgs.
CN201580065958.1 Office Action dated Nov. 29, 2019, 16 pgs.
JP2015-231213 Office Action dated Nov. 1, 2019, 9 pgs.

* cited by examiner

ACTINIC-RAY-CURABLE RESIN COMPOSITION, LAYERED FILM INCLUDING HARDCOAT FORMED THEREFROM, AND LAYERED TRANSPARENT RESIN PRODUCT

CROSS REFERENCE TO RELATED APPLICATIONS

This application is a divisional application of U.S. patent application Ser. No. 15/315,267, filed on Nov. 30, 2016, which claims the benefit of and priority to PCT/JP2015/060820, filed on Apr. 7, 2015, entitled (translation), "ACTINIC-RAY-CURABLE RESIN COMPOSITION, LAYERED FILM INCLUDING HARDCOAT FORMED THEREFROM, AND LAYERED TRANSPARENT RESIN PRODUCT," which claims the benefit of and priority to Japanese Patent Application Nos. 2014-112034, filed on May 30, 2014, and 2014-123031, also filed on Jun. 16, 2014, all of which are hereby incorporated by reference in their entirety into this application.

BACKGROUND

Field

Embodiments relate to an active energy ray-curable resin composition, and a hard coat-laminated film using the same. Embodiments relate more particularly to an active energy ray-curable resin composition capable of forming a hard coat excellent in transparency, color tone, abrasion resistance, surface hardness, bending resistance and surface appearance, and a hard coat-laminated film using the same.

Embodiments further relate to a transparent resin laminate. Embodiments relate more particularly to a transparent resin laminate which is low in specific gravity and excellent in transparency, rigidity, scratch resistance, weather resistance, impact resistance and workability (or processability), and can be used suitably as members for windows and windshields of vehicles, windows and doors of buildings, protecting plates of electronic signboards, surface members for household appliances such as refrigerators, doors of furniture such as cupboards, show windows, and the like.

DESCRIPTION OF THE RELATED ART

In recent years, there have spread touch panels which are installed on image display apparatuses such as liquid crystal displays, plasma displays and electroluminescence displays and on which inputting can be carried out by touch with a finger, a pen or the like with the display being looked at.

For touch panel display face plates, articles using glass as their substrates have conventionally been used since conforming to required properties such as heat resistance, dimensional stability, high transparency, high surface hardness and high rigidity. However, glass has disadvantages such as being low in impact resistance and liable to break; being low in workability; being difficult to handle; having a high specific gravity and being heavy; and being difficult to meet requirements of face curving and flexibilizing of displays. Then, for these applications, there have been actively made researches in materials in place of glass. There have been proposed a large number of hard coat laminates in which a hard coat excellent in surface hardness and abrasion resistance is formed on the surface of a transparent resin film substrate of a triacetylcellulose, a polyethylene terephthalate, a polycarbonate, a polymethyl methacrylate, a norbornene polymer or the like (for example, see Patent Literature 1). However, their abrasion resistance values are still insufficient. There have been demanded coating materials for forming hard coats capable of maintaining surface properties such as finger slidability even if being repeatedly wiped with a handkerchief or the like.

Also for members for windows, windshields and the like of vehicles, members for windows, doors and the like of buildings, protecting plates of electronic signboards, show windows, and the like, articles using glass as their substrates have conventionally been used since conforming to required properties such as transparency, rigidity, scratch resistance and weather resistance. Further, glass has been increasingly employed also for surface members of household appliances such as refrigerators and doors of furniture such as cupboards because of its design feeling including transparent feeling. However, as described above, glass has disadvantages such as being low in impact resistance and liable to break; being low in workability; and having a high specific gravity and being heavy. Then, for these applications, there have been actively made researches in materials in place of glass. There have been proposed transparent resin laminates having a transparent resin layer of a polycarbonate resin, an acrylic resin or the like, and a hard coat layer (for example, see Patent Literatures 2 and 3). However, their scratch resistance is still insufficient. There have been demanded transparent resin laminates capable of maintaining initial properties even if being repeatedly scrubbed by a wiper or the like and repeatedly wiped with a dustcloth or the like.

SUMMARY

Embodiments provide an active energy ray-curable resin composition capable of forming a hard coat excellent in transparency, color tone, abrasion resistance, surface hardness, bending resistance and surface smoothness, and a hard coat-laminated film using the same which is suitable as members for image display apparatuses (including image display apparatuses having a touch panel function and image display apparatuses having no touch panel function) such as liquid crystal displays, plasma displays and electroluminescence displays, particularly as display face plates of touch panels.

According to at least one embodiment, there is provided a hard coat-laminated film for a touch panel display face plate, the hard coat-laminated film including: a transparent resin film, and a hard coat formed on at least one surface of the transparent resin film from a coating material including an active energy ray-curable resin composition. The hard coat-laminated film meets the following requirements (1-i) to (1-v): (1-i) a total light transmittance of 80% or higher, (1-ii) a haze of 3.0% or lower, (1-iii) a yellowness index of 3 or lower, (1-iv) a water contact angle of a touch surface of 100° or larger; and (1-v) a water contact angle of the touch surface of 100° or larger after 20,000-times reciprocal cotton wiping of the touch panel.

According to at least one embodiment, the transparent resin film is a poly(meth)acrylimide resin film.

According to at least one embodiment, the poly(meth)acrylimide resin film is a transparent multilayer film including a first poly(meth)acrylimide resin layer ($\alpha1$), an aromatic polycarbonate resin layer ($\beta$), and a second poly(meth)acrylimide resin layer ($\alpha2$), directly laminated in this order.

According to at least one embodiment, a pencil hardness of the touch surface is 4H or higher.

According to at least one embodiment, there is provided an image display apparatus member including the hard coat-laminated film according to various embodiments described below.

According to at least one embodiment, there is provided a transparent resin laminate including a layer of a hard coat and a layer of a poly(meth)acrylimide resin sheet in order from the outermost surface layer side, whereby the transparent resin laminate meets the following properties (2-i) to (2-v): (2-i) a total light transmittance of 80% or higher, (2-ii) a haze of 5% or lower, (2-iii) a yellowness index of 3 or lower, (2-iv) a water contact angle of the hard coat surface of 100° or larger, and (2-v) a water contact angle of the hard coat surface of 100° or larger after 20,000-times reciprocal cotton wiping of the hard coat surface.

According to at least one embodiment, the poly(meth)acrylimide resin sheet is a laminated sheet including a first poly(meth)acrylimide resin layer, an aromatic polycarbonate resin layer, and a second poly(meth)acrylimide resin layer, directly laminated in this order.

According to at least one embodiment, a pencil hardness of the hard coat surface is 7H or higher.

According to at least one embodiment, there is provided a vehicle member including the transparent resin laminate according to various embodiments described below.

According to at least one embodiment, there is provided a building member including the transparent resin laminate according to various embodiments described below.

DETAILED DESCRIPTION

Figure 1:
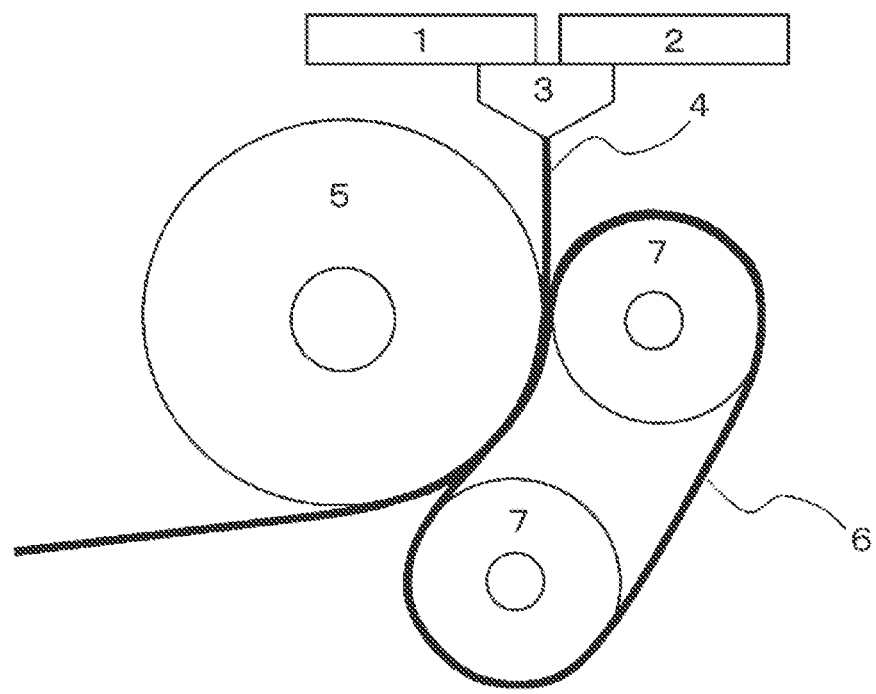
FIG. 1 is a conceptual view of an apparatus used for film formation of a transparent resin film (p-1) according to examples of various embodiments.

[I] an Active Energy Ray-Curable Resin Composition According to a First Embodiment, and a Hard Coat-Laminated Film Using the Same.

1. An Active Energy Ray-Curable Resin Composition:

An active energy ray-curable resin composition according to the first embodiment will be described.

(A) A Polyfunctional (Meth)Acrylate:

The active energy ray-curable resin composition according to an embodiment includes (A) a polyfunctional (meth)acrylate.

Component A is a (meth)acrylate having two or more (meth)acryloyl groups in one molecule thereof. This compound, since having two or more (meth)acryloyl groups in one molecule thereof, is polymerized and cured by active energy rays such as ultraviolet rays and electron beams thereby acting to form a hard coat.

Examples of the polyfunctional (meth)acrylate include (meth)acryloyl group-containing bifunctional reactive monomers such as diethylene glycol di(meth)acrylate, neopentyl glycol di(meth)acrylate, 1,6-hexanediol di(meth)acrylate, polyethylene glycol di(meth)acrylate, 2,2'-bis(4-(meth)acryloyloxypolyethyleneoxyphenyl)propane and 2,2'-bis(4-(meth)acryloyloxypolypropyleneoxyphenyl)propane; (meth)acryloyl group-containing trifunctional reactive monomers such as trimethylolpropane tri(meth)acrylate and trimethylolethane tri(meth)acrylate; (meth)acryloyl group-containing tetrafunctional reactive monomers such as pentaerythritol tetra(meth)acrylate; (meth)acryloyl group-containing hexafunctional reactive monomers such as dipentaerythritol hexaacrylate; and polymers (oligomers and prepolymers) composed of one or more thereof as constituent monomers. Component A can be used singly or as a mixture of two or more thereof.

In connection with the above illustration, the term meth (acrylate) is herein referred to as an acrylate or methacrylate.

(B) A Compound Having an Alkoxysilyl Group and a (Meth)Acryloyl Group:

The active energy ray-curable resin composition according to an embodiment includes (B) a compound having an alkoxysilyl group and a (meth)acryloyl group.

The (meth)acryloyl group is herein intended to mean an acryloyl or methacryloyl group. Here, component B is distinguished from component A in that component B has an alkoxysilyl group. A compound of component A has no alkoxysilyl group. According to at least one embodiment, a compound having an alkoxysilyl group and two or more (meth)acryloyl groups in one molecule thereof is classified into component B.

Component B can chemically bond with or strongly interact with component A due to having a (meth)acryloyl group in the molecule; and with component D due to having an alkoxysilyl group in the molecule. Component B serves to largely improve the abrasion resistance of a hard coat by such chemical bond or strong interaction. Further, due to having a (meth)acryloyl group in the molecule or due to having an alkoxysilyl group in the molecule, component B chemically bonds with or strongly interacts with component E also. Component B also serves to prevent trouble such as bleedout of component E by such chemical bond or strong interaction.

Examples of component B include compounds having a chemical structure represented by the general formula "$(-SiO_2RR'-)_n.(-SiO_2RR''-)_m$". Here, n is a natural number (positive integer), and m is 0 or a natural number. Preferably, n is a natural number of 2 to 10, and m is 0 or a natural number of 1 to 10. R is an alkoxy group such as a methoxy group ($CH_3O-$) or an ethoxy group ($C_2H_5O-$). R' is an acryloyl group ($CH_2=CHCO-$) or a methacryloyl group ($CH_2=C(CH_3)CO-$). R'' is an alkyl group such as a methyl group ($CH_3$) or an ethyl group ($CH_2CH_3$).

Examples of component B include compounds having a chemical structure represented by each of the general formulae $(-SiO_2(OCH_3)(OCHC=CH_2)-)_n$, $(-SiO_2(OCH_3)(OC(CH_3)C=CH_2)-)_n$, $(-SiO_2(OCH_3)(OCHC=CH_2)-)_n.(-SiO_2(OCH_3)(CH_3)-)_m$, $(-SiO_2(OCH_3)(OC(CH_3)C=CH_2)-)_n.(-SiO_2(OCH_3)(CH_3)-)_m$, $(-SiO_2(OC_2H_5)(OCHC=CH_2)-)_n$, $(-SiO_2(OC_2H_5)(OC(CH_3)C=CH_2)-)_n$, $(-SiO_2(OC_2H_5)(OCHC=CH_2)-)_n.(-SiO_2(OCH_3)(CH_3)-)_m$, and $(-SiO_2(OC_2H_5)(OC(CH_3)C=CH_2)-)_n.(-SiO_2(OCH_3)(CH_3)-)_m$. Here, n is a natural number (positive integer), and m is 0 or a natural number. Preferably, n is a natural number of 2 to 10, and m is 0 or a natural number of 1 to 10.

Component B can be used singly or as a mixture of two or more thereof.

The blend amount of component B is, from the viewpoint of the abrasion resistance, with respect to 100 parts by mass of component A, 0.2 parts by mass or larger, preferably 0.5 parts by mass or larger, and more preferably 1 part by mass or larger. On the other hand, from the viewpoint of making the water repellency to be easily developed, and from the viewpoint of making the amount of component C not to become excessive when the blend ratio between component B and component C is made to be in a preferable range, the blend amount of component B is, with respect to 100 parts by mass of component A, 4 parts by mass or smaller, preferably 3 parts by mass or smaller, and more preferably 2 parts by mass or smaller.

Further from the viewpoint of making component B to chemically bond with or strongly interact with component D, with respect to the blend ratio between component B and component D, component B is, with respect to 100 parts by mass of component D, usually 0.2 to 80 parts by mass, preferably 0.5 to 15 parts by mass, and more preferably 2 to 7 parts by mass.

(C) An Organotitanium:

The active energy ray-curable resin composition according to at least one embodiment includes (C) an organotitanium.

Component C is a component to aid the function of component B. From the viewpoint of largely improving the abrasion resistance of a hard coat, component B and component C exhibit specific favorable affinity. Further, component C itself chemically bonds with or strongly interacts with component D and the like, and serves to enhance the abrasion resistance of a hard coat.

Examples of the organotitanium include tetra-i-propoxytitanium, tetra-n-butoxytitanium, tetrakis(2-ethylhexyloxy)titanium, titanium-i-propoxyoctylene glycolate, di-i-propoxytitanium bis(acetylacetonate), propanedioxytitanium bis(ethylacetoacetate), tri-n-butoxytitanium monostearate, di-i-propoxytitanium distearate, titanium stearate, di-i-propoxytitanium diisostrearate, (2-n-butoxycarbonylbenzoyloxy)tributoxytitanium and di-n-butoxy-bis(triethanolaminato)titanium; and polymers composed of one or more thereof. Component C can be used singly or as a mixture of two or more thereof.

Among these, tetra-i-propoxytitanium, tetra-n-butoxytitanium and tetrakis(2-ethylhexyloxy)titanium and titanium-i-propoxyoctylene glycolate, which are alkoxytitaniums, are preferable from the viewpoint of the abrasion resistance and the color tone.

The blend amount of component C is, from the viewpoint of the abrasion resistance, with respect to 100 parts by mass of component A, 0.05 parts by mass or larger, preferably 0.1 parts by mass or larger, and more preferably 0.2 parts by mass or larger. On the other hand, from the viewpoint of the color tone, the blend amount of component C is, with respect to 100 parts by mass of component A, 3 parts by mass or smaller, preferably 2 parts by mass or smaller, and more preferably 1.5 parts by mass or smaller.

Further from the viewpoint of effectively aid the function of component B, with respect to the blend ratio between component C and component B, component C is, with respect to 100 parts by mass of component B, usually 1.25 to 1,500 parts by mass, preferably 5 to 150 parts by mass, and more preferably 20 to 80 parts by mass.

(D) Microparticles Having an Average Particle Diameter of 1 to 300 nm:

The active energy ray-curable resin composition according to at least one embodiment includes (D) microparticles having an average particle diameter of 1 to 300 nm.

Component D serves to increase the surface hardness of a hard coat. However, component D has weak interaction with component A, and causes the abrasion resistance to become insufficient. Then, in accordance with at least one embodiment, by using component B capable of chemically bonding with or strongly interacting with both component A and component D, and component C aiding the function of component B, this problem comes to be solved.

Therefore, component D is preferably a substance capable of chemically bonding with or strongly interacting with component B, and more preferably a substance capable of chemically bonding with or strongly interacting with component B and component C.

As component D, there can be used either of inorganic microparticles and organic microparticles. Examples of the inorganic microparticles include silica (silicon dioxide); metal oxide microparticles such as aluminum oxide, zirconia, titania, zinc oxide, germanium oxide, indium oxide, tin oxide, indium tin oxide, antimony oxide and cerium oxide; metal fluoride microparticles such as magnesium fluoride and sodium fluoride; metal sulfide microparticles; metal nitride microparticles; and metal microparticles. Examples of the organic microparticles include resin beads of styrene resins, acrylic resins, polycarbonate resins, ethylene resins, cured resins of an amino compound with formaldehyde, and the like. These can be used singly or in a combination of two or more.

Any in the group of these substances exemplified as component D can be believed to be at least a substance capable of chemically bonding with or strongly interacting with component B.

Further, for the purpose of enhancing the dispersibility of the microparticles in a coating material and increasing the surface hardness of an obtained hard coat, there may be used the microparticles treated on the surface thereof with a surface treating agent. Examples of the surface treating agent include a silane coupling agent such as a vinylsilane or an aminosilane; a titanate coupling agent; an aluminate coupling agent; an organic compound having a reactive functional group such as an ethylenic unsaturated bond group such as a (meth)acryloyl group, a vinyl group or an allyl group, or an epoxy group; a fatty acid; a fatty acid metal salt; or the like.

Among these microparticles, in order to obtain a hard coat having a higher surface hardness, microparticles of silica and aluminum oxide are preferable, and microparticles of silica are more preferable. Examples of commercially available silica microparticles include Snowtex (trade name) of Nissan Chemical Industries, Ltd, and Quattron (trade name) of Fuso Chemical Co., Ltd.

The average particle diameter of component D is 300 nm or smaller from the viewpoint of holding the transparency of a hard coat and from the viewpoint of securely attaining the effect of improving the surface hardness of the hard coat. The average particle diameter of component D is preferably 200 nm or smaller, and more preferably 120 nm or smaller. Meanwhile, there is especially no reason for restricting the lower limit of the average particle diameter, but usually available microparticles are ones of about 1 nm at the finest.

The average particle diameter of the microparticles, which is herein referred to, is a particle diameter at which the cumulation from the smaller side of the particle diameter becomes 50% by mass in a particle diameter distribution curve measured using a laser diffraction/scattering particle size analyzer "MT3200II (trade name)" of Nikkiso Co., Ltd.

The blend amount of component D is, from the viewpoint of the surface hardness, with respect to 100 parts by mass of component A, 5 parts by mass or larger, and preferably 20 parts by mass or larger. On the other hand, from the viewpoint of the abrasion resistance and the transparency, the blend amount of component D is, with respect to 100 parts by mass of component A, 100 parts by mass or smaller, preferably 70 parts by mass or smaller, and more preferably 50 parts by mass or smaller.

(E) A Water Repellant:

It is preferable from the viewpoint of enhancing the finger slidability, the fouling-preventive property and the fouling wiping-off property that the active energy ray-curable resin composition according to at least one embodiment further includes 0.01 to 7 parts by mass (an amount relative to 100 parts by mass of (A) the polyfunctional (meth)acrylate) of (E) a water repellant.

Examples of the water repellant include wax water repellants such as paraffin wax, polyethylene wax and acrylic-ethylene copolymer waxes; silicon water repellants such as silicon oils, silicon resins, polydimethylsiloxane and alkylalkoxysilanes; and fluorine-containing water repellants such as fluoropolyether water repellants and fluoropolyalkyl water repellants. Component E can be used singly or as a mixture of two or more thereof.

Among these water repellants, from the viewpoint of the water repellant performance, fluoropolyether water repellants are preferable. From the viewpoint of preventing trouble such as bleedout of component E by the chemical bond or the strong interaction of component A or component B with component E, as component E, a water repellant (hereinafter, abbreviated to a (meth)acryloyl group-containing fluoropolyether water repellant) is more preferable which contains a compound having a (meth)acryloyl group and a fluoropolyether group in its molecule. As component E, from the viewpoint of suitably regulating the chemical bond or the strong interaction of component A or component B with component E, and highly holding the transparency and simultaneously developing good water repellency, there may be used a mixture of an acryloyl group-containing fluoropolyether water repellant and a methacryloyl group-containing fluoropolyether water repellant.

The blend amount of component E in the case of being used is, from the viewpoint of preventing trouble such as bleedout of component E, with respect to 100 parts by mass of component A, usually 7 parts by mass or smaller, preferably 4 parts by mass or smaller, and more preferably 2 parts by mass or smaller. The lower limit of the blend amount of component E is not especially limited because component E is an optional component, but from the viewpoint of attaining desired effects, is usually 0.01 parts by mass or larger, preferably 0.05 parts by mass or larger, and more preferably 0.1 parts by mass or larger.

Further, it is preferable from the viewpoint of improving the curability of the active energy ray-curable resin composition according to at least one embodiment by active energy rays that the resin composition further includes a compound having two or more isocyanate groups (—N=C=O) in one molecule thereof and/or a photopolymerization initiator.

Examples of the compound having two or more isocyanate groups in one molecule thereof include methylenebis-4-cyclohexyl isocyanate; polyisocyanates such as trimethylolpropane adducts of tolylene diisocyanate, trimethylolpropane adducts of hexamethylene diisocyanate, trimethylolpropane adducts of isophorone diisocyanate, isocyanurates of tolylene diisocyanate, isocyanurates of hexamethylene diisocyanate, isocyanurates of isophorone diisocyanate, and biurets of hexamethylene diisocyanate; and urethane crosslinking agents such as blocked isocyanates of the polyisocyanates. The compound having two or more isocyanate groups in one molecule thereof can be used singly or as a mixture of two or more thereof. Further when crosslinking is carried out, as required, there may be added a catalyst such as dibutyltin dilaurate or dibutyltin diethyl hexoate.

Examples of the photopolymerization initiator include benzophenone compounds such as benzophenone, methyl-o-benzoyl benzoate, 4-methylbenzophenone, 4,4'-bis(diethylamino)benzophenone, methyl o-benzoylbenzoate, 4-phenylbenzophenone, 4-benzoyl-4'-methyldiphenyl sulfide, 3,3',4,4'-tetra(tert-butylperoxycarbonyl)benzophenone and 2,4,6-trimethylbenzophenone; benzoin compounds such as benzoin, benzoin methyl ether, benzoin ethyl ether, benzoin isopropyl ether and benzyl methyl ketal; acetophenone compounds such as acetophenone, 2,2-dimethoxy-2-phenylacetophenone and 1-hydroxycyclohexyl phenyl ketone; anthraquinone compounds such as methylanthraquinone, 2-ethylanthraquinone and 2-amylanthraquinone; thioxanthone compounds such as thioxanthone, 2,4-diethylthioxanthone and 2,4-diisopropylthioxanthone; alkylphenone compounds such as acetophenone dimethyl ketal; triazine compounds; biimidazole compounds; acylphosphine oxide compounds; titanocene compounds; oxime ester compounds; oxime phenylacetate ester compounds; hydroxyketone compounds; and aminobenzoate compounds. The photopolymerization initiator can be used singly or as a mixture of two or more thereof.

Further as required, the active energy ray-curable resin composition according to at least one embodiment may include one or two or more additives such as antistatic agents, surfactants, leveling agents, thixotropy imparting agents, anti-fouling agents, printability improvers, antioxidants, weather resistance stabilizers, light resistance stabilizers, ultraviolet absorbents, thermal stabilizers, colorants and fillers.

Further as required, the active energy ray-curable resin composition according to at least one embodiment may include a solvent in order to dilute the resin composition to a concentration facilitating coating. The solvent is not especially limited as long as it does not contribute to reacting with components A to D and other optional components or catalyzing (promoting) self-reactions (including deteriorative reactions) of these components. Examples of the solvent include 1-methoxy-2-propanol, ethyl acetate, n-butyl acetate, toluene, methyl ethyl ketone, methyl isobutyl ketone, diacetone alcohol and acetone.

The active energy ray-curable resin composition can be obtained by mixing and stirring these components.

2. A Hard Coat-Laminated Film:

A hard coat-laminated film according to the first embodiment will be described.

The hard coat-laminated film according to at least one embodiment can be obtained preferably by forming a hard coat including a coating material including the active energy ray-curable resin composition according to at least one embodiment, on at least one surface of a transparent resin film.

The hard coat is formed on at least one surface of the transparent resin film, or from the viewpoint of the curling resistance, preferably on both surfaces thereof.

Preferably, the hard coat-laminated film has, in order from the outermost surface layer side, a first hard coat layer; a transparent resin film layer; and a second hard coat layer, wherein the first hard coat layer is formed from a coating material including the active energy ray-curable resin composition according to at least one embodiment.

Here, the "surface layer side" means a side, of an article formed of a hard coat laminate being a multilayer structure, nearer to the outer face when the article is placed in on-site use (i.e., a touch surface in the case of a touch panel display face plate).

Further, the hard coat of the hard coat-laminated film is not limited to of one layer, and may be of two or more layers. Further the transparent resin film layer is not limited to of one layer, and may be of two or more layers. Further the hard coat-laminated film may have, as required, the hard coat and an optional layer(s) other than the transparent resin film. Examples of the optional layer include an anchor coat layer, a pressure-sensitive adhesive layer, a transparent conductive layer, a high-refractive index layer, a low-refractive index layer and an antireflective layer.

A method for forming a hard coat by using a coating material for forming a hard coat including the active energy ray-curable resin composition according to at least one embodiment is not especially limited, and there can be used a known web applying method. The method specifically includes methods such as roll coating, gravure coating, reverse coating, roll brushing, spray coating, air knife coating and die coating.

The thickness of the hard coat is not especially limited, but may be, from the viewpoint of the surface hardness, the rigidity, the thermal resistance and the dimensional stability of the hard coat-laminated film, usually 1 μm or larger, preferably 5 μm or larger, more preferably 10 μm or larger, and still more preferably 20 μm or larger. Further the thickness of the hard coat may be, from the viewpoint of the cutting work suitability and the web handleability of the hard coat-laminated film, preferably 100 μm or smaller, and more preferably 50 μm or smaller.

The transparent resin film is a layer acting as a transparent film substrate for forming the hard coat. The transparent resin film is not limited as long as having a high transparency and exhibiting no coloration, and any transparent resin film can be used.

Examples of the transparent resin film include films of cellulose ester resins such as triacetylcellulose; polyester resins such as polyethylene terephthalate; cyclic hydrocarbon resins such as ethylene norbornene copolymers; acrylic resins such as polymethyl methacrylate and polyethyl methacrylate; poly(meth)acrylimide resins; aromatic polycarbonate resins; polyolefin resins such as polypropylene and 4-methylpentene-1; polyamide resins; polyarylate resins; polymer-type urethane acrylate resins; polyimide resins; and the like. The transparent resin film includes non-stretched films, uniaxially stretched films and biaxially stretched films. The transparent resin film further includes laminated films of one or two or more thereof.

The transparent resin film is preferably a poly(meth)acrylimide resin film. Use of the poly(meth)acrylimide resin film makes a hard coat-laminated film excellent in surface hardness, abrasion resistance, transparency, surface smoothness, appearance, rigidity, thermal resistance and dimensional stability, and the hard coat-laminated film can suitably be used as a display face plate and a transparent conductive substrate of touch panels.

The poly(meth)acrylimide resin is a thermoplastic resin having features as they are of high transparency, high surface hardness and high rigidity of acrylic resins, having introduced features of being excellent in thermal resistance and dimensional stability of polyimide resins, and being improved in a drawback of coloration from light yellow to reddish brown. The poly(meth)acrylimide resin is disclosed, for example, in JP 2011-519999 A. Here, the term poly(meth)acrylimide is herein intended to mean polyacrylimide or polymethacrylimide.

The poly(meth)acrylimide resin is not limited as long as having high transparency and exhibiting no coloration for the purpose of using the hard coat-laminated film for optical articles such as touch panels, and any known poly(meth)acrylimide resins can be used.

Preferable examples of the poly(meth)acrylimide resin include ones having a yellowness index (measured using a colorimeter "SolidSpec-3700" (trade name) of Shimadzu Corp. according to JIS K7105:1981) of 3 or lower. The yellowness index of the poly(meth)acrylimide resin is more preferably 2 or lower, and still more preferably 1 or lower.

Further from the viewpoint of the extrusion load, and the stability of the melted film, preferable examples of the poly(meth)acrylimide resin include ones having a melt mass flow rate (measured under the conditions of 260° C. and 98.07 N according to ISO 1133) of 0.1 to 20 g/10 min. The melt mass flow rate of the poly(meth)acrylimide resin is more preferably 0.5 to 10 g/10 min.

Further, the glass transition temperature of the poly(meth)acrylimide resin is preferably 150° C. or higher from the viewpoint of the thermal resistance. The glass transition temperature is more preferably 170° C. or higher.

The poly(meth)acrylimide resin can further include, as required, thermoplastic resins other than the poly(meth)acrylimide resin; pigments, inorganic fillers, organic fillers, and resin fillers; and additives such as lubricants, antioxidants, weather resistance stabilizers, thermal stabilizers, mold release agents, antistatic agents and surfactants, within limits not contradictory to the objects of at least one embodiment. The blend amount of the optional component(s) is usually about 0.01 to 10 parts by mass relative to 100 parts by mass of the poly(meth)acrylimide resin.

Commercially available examples of the poly(meth)acrylimide resin include "PLEXIMID TT70" (trade name) of Evonik Degussa GmbH.

The poly(meth)acrylimide resin film is preferably a transparent multilayer film in which a first poly(meth)acrylimide resin layer ($\alpha 1$); an aromatic polycarbonate resin layer ($\beta$); and a second poly(meth)acrylimide resin layer ($\alpha 2$) are directly laminated in this order. In this connection, the hard coat-laminated film is herein described on condition that a touch surface is formed on the $\alpha 1$ layer side.

The poly(meth)acrylimide resin, though generally being excellent in thermal resistance and surface hardness, is liable to become insufficient in cutting workability. By contrast, the aromatic polycarbonate resin, though being excellent in cutting workability, is liable to become insufficient in thermal resistance and surface hardness. Hence, use of a transparent multilayer film having the above layer structure enables a hard coat-laminated film mutually offsetting the drawbacks of the both and being excellent in any of thermal resistance, surface hardness and cutting workability to be easily obtained.

The layer thickness of the $\alpha 1$ layer is not especially limited, but may be, from the viewpoint of the thermal resistance and the surface hardness of the hard coat-laminated film according to at least one embodiment, usually 20 μm or larger, preferably 40 μm or larger, and more preferably 60 μm or larger.

The layer thickness of the $\alpha 2$ layer is not especially limited, but is, from the viewpoint of the curling resistance of the hard coat-laminated film according to the an embodiment, preferably the same layer thickness as in the $\alpha 1$ layer.

Here, "the same layer thickness" should not be interpreted as the same layer thickness in the physicochemically strict sense. It should be interpreted as the same layer thickness within a variation in a process/quality control commonly performed in industry. The reason is that the curling resistance of a multilayer film can be kept good if the layer thickness is the same layer thickness within a variation in a process/quality control commonly performed in industry. A cast multilayer film obtained by a T-die coextrusion method is typically subjected to a process/quality control within a variation of about −5 to +5 and therefore the layer thickness of 65 μm and the layer thickness of 75 μm should be interpreted to be identical. "The same layer thickness" here can be paraphrased as "substantially the same layer thickness".

The layer thickness of the β layer is not especially limited, but may be, from the viewpoint of the cutting processability of the hard coat-laminated film according to at least one embodiment, usually 20 μm or larger, preferably 80 μm or larger, and more preferably 120 μm or larger.

A poly(meth)acrylimide resin to be used for the α1 layer and the α2 layer was described in the above.

Here, as a poly(meth)acrylimide resin to be used for the α1 layer and a poly(meth)acrylimide resin to be used for the α2 layer, there can be used poly(meth)acrylimide resins having different resin properties, for example, different melt mass flow rates and glass transition temperatures. From the viewpoint of the curling resistance of the hard coat-laminated film according to at least one embodiment, however, there are more preferably used poly(meth)acrylimide resins having the same resin properties. For example, use of a poly(meth)acrylimide resin of the same grade and the same lot for the α 1 layer and the α2 layer is one of preferred embodiments.

As the aromatic polycarbonate resin to be used for the β layer, there can be used, for example, one or a mixture of two or more of aromatic polycarbonate resins including: polymers obtained by an interfacial polymerization method of an aromatic dihydroxy compound such as bisphenol A, dimethylbisphenol A or 1,1-bis(4-hydroxyphenyl)-3,3,5-trimethylcyclohexane with phosgene; and polymers obtained by a transesterification of an aromatic dihydroxy compound such as bisphenol A, dimethylbisphenol A or 1,1-bis(4-hydroxyphenyl)-3,3,5-trimethylcyclohexane with a carbonate diester such as diphenyl carbonate.

Preferable examples of optional components which can be contained in the aromatic polycarbonate resin include core shell rubbers. With respect to 100 parts by mass of the total amount of the aromatic polycarbonate resin and the core shell rubber, use of the core shell rubber in an amount of 0 to 30 parts by mass (100 to 70 parts by mass of the aromatic polycarbonate resin), preferably 0 to 10 parts by mass (100 to 90 parts by mass of the aromatic polycarbonate resin) can further improve the cutting processability and the impact resistance.

Examples of the core shell rubber include core shell rubbers such as methacrylate-styrene/butadiene rubber graft copolymers, acrylonitrile-styrene/butadiene rubber graft copolymers, acrylonitrile-styrene/ethylene-propylene rubber graft copolymers, acrylonitrile-styrene/acrylate graft copolymers, methacrylate/acrylate rubber graft copolymers and methacrylate-acrylonitrile/acrylate rubber graft copolymers. These core shell rubbers can be used singly or as a mixture of two or more thereof.

The aromatic polycarbonate resin can further contain, as required, thermoplastic resins other than the aromatic polycarbonate resin or the core shell rubber; pigments, inorganic fillers, organic fillers, and resin fillers; and additives such as lubricants, antioxidants, weather resistance stabilizers, thermal stabilizers, mold release agents, antistatic agents and surfactants, within limits not contradictory to the objects of at least one embodiment. The blend amount of these optional components is usually about 0.01 to 10 parts by mass relative to 100 parts by mass of the total amount of the aromatic polycarbonate resin and the core shell rubber.

A method for producing the poly(meth)acrylimide resin film is not especially limited, but includes, for example, a method including the steps of (A) continuously extruding a melted film of the poly(meth)acrylimide resin from a T die using an apparatus including an extruder and the T die; and (B) supplying and charging the above melted film of the poly(meth)acrylimide resin between a first rotating or circulating mirror-finished body and a second rotating or circulating mirror-finished body and pressing the melted film.

Similarly, a method for producing the transparent multilayer film having the α1 layer, the β layer and the α2 layer directly laminated in this order is not especially limited, but includes, for example, a method including the steps of (A') continuously coextruding a melted film of a transparent multilayer film in which a first poly(meth)acrylimide resin layer (α1); an aromatic polycarbonate resin layer (β); and a second poly(meth)acrylimide resin layer (α2) are directly laminated in this order from a T die using a coextrusion apparatus including an extruder and the T die; and (B') supplying and charging the above melted film of the transparent multilayer film between a first rotating or circulating mirror-finished body and a second rotating or circulating mirror-finished body and pressing the melted film.

As the T die to be used in the step (A) or the step (A'), any known one can be used. Examples of the T die include manifold dies, fish tail dies and coat hanger dies.

As the coextrusion apparatus, any known ones can be used. Examples of the coextrusion apparatus include ones of feed block type, multi-manifold type and stack plate type.

As the extruder to be used in the step (A) or the step (A'), any known one can be used. Examples of the extruder include single-screw extruders, co-rotating twin-screw extruders and counter-rotating twin-screw extruders.

Further, in order to suppress the degradation of the poly(meth)acrylimide resin and the aromatic polycarbonate resin, nitrogen purging in the extruder is also one of preferable methods.

Further, the poly(meth)acrylimide resin is, since being a resin high in hygroscopicity, preferably dried before being supplied to film formation. Also, conveying and charging the poly(meth)acrylimide resin dried in a drier directly from the drier to the extruder is one of preferable methods. The set temperature of the drier is preferably 100 to 150° C. Further, installing a vacuum vent on the extruder (usually on a measuring zone at a screw tip) is one of preferable methods.

The temperature of the T die used in the step (A) or the step (A') is preferably set at 260° C. or more in order to stably perform the step of continuously extruding or coextruding the melted film of the poly(meth)acrylimide resin or the melted film of the transparent multilayer film. More preferably, the temperature of the T die is 270° C. or more. In addition, in order to suppress the deterioration of the poly(meth)acrylimide resin and the aromatic polycarbonate resin, the temperature of the T die is preferably set at 350° C. or less.

In addition, the ratio (R/T) of the lip opening (R) to the thickness of the obtained poly(meth)acrylimide film (T) is preferably 10 or less, more preferably 5 or less, from the viewpoint of preventing retardation from increasing. In addition, the ratio (R/T) is preferably 1 or more, more preferably 1.5 or more, from the viewpoint of preventing the extrusion load from becoming excessive.

Examples of the first mirror-finished body used in the step (B) or the step (B') include a mirror-finished roll and a mirror-finished belt. In addition, examples of the second mirror-finished body include a mirror-finished roll and a mirror-finished belt.

The mirror-finished roll is a roll whose surface is mirror-finished. The mirror-finished roll includes those made of metals, ceramics, and silicon rubbers. In addition, the surface of the mirror-finished roll can be subjected to a chrome plating treatment, an iron-phosphorus alloy plating treatment, a hard carbon treatment by PVD or CVD, or the like for the purpose of protection from corrosion and scratching.

The mirror-finished belt is a seamless belt usually made of a metal whose surface is mirror-finished. The mirror-finished belt is arranged, for example, to loop around a pair of belt rollers and circulate between them. In addition, the surface of the mirror-finished belt can be subjected to a chrome plating treatment, an iron-phosphorus alloy plating treatment, a hard carbon treatment by PVD or CVD, or the like for the purpose of protection from corrosion and scratching.

The mirror finishing is not limited and can be performed by any method. Examples thereof include a method of performing polishing using fine abrasive grains to set the arithmetic average roughness (Ra) of the surface of the mirror-finished body at preferably 100 nm or less, more preferably 50 nm or less, and set the ten-point average roughness (Rz) at preferably 500 nm or less, more preferably 250 nm or less.

Though there is no intention of being bound by any theory, it can be considered that a poly(meth)acrylimide resin film or a transparent multilayer film having excellent transparency, surface smoothness, and appearance is obtained by the film forming method because the melted film of the poly(meth)acrylimide resin film or the transparent multilayer film is pressed by the first mirror-finished body and the second mirror-finished body, and thus the highly smooth surface states of the first mirror-finished body and the second mirror-finished body are transferred to the film to correct faulty portions such as die streaks.

In order that the transfer of the surface states is performed well, the surface temperature of the first mirror-finished body is preferably 100° C. or higher, more preferably 120° C. or higher, and further preferably 130° C. or higher. On the other hand, in order to prevent the development on the film of appearance faults (exfoliation marks) accompanying the peeling-off from the first mirror-finished body, the surface temperature of the first mirror-finished body is made to be preferably 200° C. or lower, and more preferably 160° C. or lower.

In order that the transfer of the surface states is performed well, the surface temperature of the second mirror-finished body is preferably 20° C. or higher, more preferably 60° C. or higher, and further preferably 100° C. or higher. On the other hand, in order to prevent the development on the film of appearance faults (exfoliation marks) accompanying the peeling-off from the second mirror-finished body, the surface temperature of the second mirror-finished body is made to be preferably 200° C. or lower, and more preferably 160° C. or lower.

The surface temperature of the first mirror-finished body is preferably higher than the surface temperature of the second mirror-finished body. This is because the film is held by the first mirror-finished body and fed to the next transport roll.

Further, when the hard coat is formed, the hard coat-layer forming surface or both surfaces of the poly(meth)acrylimide resin film or the transparent multilayer film serving as a transparent film substrate may previously be subjected to an easy-adhesion treatment such as a corona discharge treatment or an anchor coat formation in order to enhance the adhesive strength with the hard coat.

If the corona discharge treatment is performed, a higher interlayer adhesive strength can be obtained through control of the wetting index (measured according to JIS K6768: 1999) to be usually 50 mN/m or more, preferably 60 mN/m or more. After the corona discharge treatment is performed, an anchor coat layer may be further formed.

The corona discharge treatment involves passing the film between an insulated electrode and a dielectric roll, and applying a high-frequency high-voltage therebetween to generate a corona discharge thereby treating the film surface. The corona discharge ionizes oxygen and the like; and the ions collide against the film surface. This can cause the scission of resin molecule chains and the addition of oxygen-containing functional groups to resin molecule chains on the film surface thereby increasing the wetting index.

The amount of the treatment (S) per unit area and unit time of the corona discharge treatment can be determined so as to have a wetting index falling within the aforementioned range. The amount of the treatment (S) is typically 80 W·min/m$^2$ or more, preferably 120 W·min/m$^2$ or more. The amount of the treatment (S) is preferably reduced to 500 W·min/m$^2$ or less in order to prevent the film from degradation. More preferably, the amount of the treatment (S) is 400 W·min/m$^2$ or less.

Here, the amount of the treatment (S) is defined by the following expression.

$$S=P/(L \cdot V)$$

wherein,
S: an amount of a treatment (W·min/m$^2$);
P: a discharge power (W);
L: a length of the discharge electrode (m); and
V: a line velocity (m/min).

An anchor coat agent for forming the anchor coat is not especially limited as long as having a high transparency and exhibiting no coloration. As the anchor coat agent, there can be used, for example, a known one such as a polyester, an acrylic, a polyurethane, an acrylic urethane and a polyester urethane. Among these, a thermoplastic urethane anchor coat agent is preferable from the viewpoint of improving the adhesive strength with the hard coat.

Further, as the anchor coat agent, there may be used a coating material containing a silane coupling agent. The silane coupling agent may be silane compounds having at least two different reactive groups selected from a hydrolyzable group (for example, an alkoxy group such as a methoxy group and an ethoxy group, an acyloxy group such as an acetoxy group, and a halogen group such as a chloro group), and an organic functional group (for example, an amino group, a vinyl group, an epoxy group, a methacryloxy group, an acryloxy group and an isocyanate group). Such a silane coupling agent functions to improve the adhesive strength with the hard coat. Among these, from the viewpoint of improving the adhesive strength with the hard coat, silane coupling agents having an amino group are preferable.

The coating material containing the silane coupling agent may be one containing the silane coupling agent in a major amount (50 mass % or more in terms of the solid content). It is preferred that 75 mass % or more, further preferably 90 mass % or more of the solid content of the coating material is the silane coupling agent.

Examples of the silane coupling agent having an amino group include N-2-(aminoethyl)-3-aminopropylmethyldimethoxysilane, N-2-(aminoethyl)-3-aminopropylt-rimethoxysilane, N-2-(aminoethyl)-3-aminopropyltriethoxysilane, 3-aminopropyltrimethoxysilane, 3-aminopropyltriethoxysilane, 3-triethoxysilyl-N-(1,3-dimethyl-butylidene)propylamine, N-phenyl-3-aminopropylt-rimethoxysilane, and N-(vinylbenzyl)-2-aminoethyl-3-aminopropyltrimethoxysilane. The silane coupling agent having an amino group can be used singly or as a mixture of two or more thereof.

A method for forming the anchor coat by using the anchor coat agent is not limited, and any known method can be used. Specific examples of the method include roll coating, gravure coating, reverse coating, roll brushing, spray coating, air knife coating and die coating. At this time, as required, there can be used an optional dilution solvent(s), for example, methanol, ethanol, 1-methoxy-2-propanol, n-butyl acetate, toluene, methyl ethyl ketone, methyl isobutyl ketone, ethyl acetate or acetone.

The anchor coat agent may further contain one or two or more additives such as antioxidants, weather resistance stabilizers, light resistance stabilizers, ultraviolet absorbents, thermal stabilizers, antistatic agents, surfactants, colorants, infrared shielding agents, leveling agents, thixotropy imparting agents and fillers, within limits not contradictory to the objects of at least one embodiment.

The thickness of the anchor coat is usually about 0.01 to 5 µm, and preferably 0.1 to 2 µM.

The thickness of the transparent resin film is not especially limited, but may be, from the viewpoint of the handling properties, usually 20 µm or larger, and preferably 50 µm or larger. In the case where the hard coat-laminated film according to an embodiment is used as a display face plate of touch panels, from the viewpoint of holding the rigidity, the thickness of the transparent resin film may be usually 100 µm or larger, preferably 200 µm or larger, and more preferably 300 µm or larger. Further from the viewpoint of meeting the requirement of the thickness reduction of touch panels, the thickness of the transparent resin film may be usually 1,500 µm or smaller, preferably 1,200 µm or smaller, and more preferably 1,000 µm or smaller. In the case where the hard coat-laminated film is used in other applications not requiring as high rigidity as in a display face plate for touch panels, from the viewpoint of the economic efficiency, the thickness of the transparent resin film may be usually 250 µm or smaller, and preferably 150 µm or smaller.

The hard coat-laminated film according to at least one embodiment has a total light transmittance of preferably 80% or higher as measured according to JIS K7361-1:1997 by using a turbidimeter "NDH2000 (trade name)" of Nippon Denshoku Industries Co., Ltd. The hard coat-laminated film, when being a highly transparent one having a total light transmittance of 80% or higher, can suitably be used for a display face plate of touch panels and the like. The total light transmittance is preferably a higher one, and more preferably 85% or higher, and still more preferably 90% or higher.

The hard coat-laminated film according to at least one embodiment has a haze of preferably 3.0% or lower as measured according to JIS K7136:2000 by using a turbidimeter "NDH2000 (trade name)" of Nippon Denshoku Industries Co., Ltd. The hard coat-laminated film, when being a highly transparent one having a haze of 3.0% or lower, can suitably be used for a display face plate of touch panels and the like. The haze is preferably a lower one, and more preferably 2.0% or lower, and still more preferably 1.5% or lower.

The hard coat-laminated film according to at least one embodiment has a yellowness index of preferably 3 or lower as measured according to JIS K7105:1981 by using a chromaticity meter "SolidSpec-3700 (trade name)" of Shimadzu Corp. The hard coat-laminated film, when being a coloration-free one having a yellowness index of 3 or lower, can suitably be used for a display face plate of touch panels and the like. The yellowness index is preferably a lower one, and more preferably 2 or lower, and still more preferably 1 or lower.

In the case where the hard coat-laminated film according to at least one embodiment is used as a display face plate of touch panels, the hard coat-laminated film has a water contact angle of a touch surface thereof of preferably 100° or larger as measured by a method of the item (4) described below (in Examples). The "touch surface" of the hard coat-laminated film herein means a surface of the film acting as one surface of the touch panel display face plate on which input operations are to be carried out by touch with a finger or a pen. When the water contact angle is 100° or larger, the touch panel can be operated by desirably sliding a finger or a pen on the touch surface of the hard coat-laminated film. From the viewpoint of desirably sliding a finger or a pen, the water contact angle is preferably a larger one, and more preferably 105° or larger. On the other hand, the water contact angle has especially no upper limit, but from the viewpoint of the finger slidability, about 120° usually suffices.

In the case where the hard coat-laminated film according to at least one embodiment is used as a display face plate of touch panels, the hard coat-laminated film has a water contact angle of a touch surface thereof after 20,000-times reciprocal cotton wiping of preferably 100° or larger as measured by a method of the item (5) described below (in Examples). When the water contact angle of the touch surface after 20,000-times reciprocal cotton wiping is 100° or larger, the surface properties such as the finger slidability can be maintained even if the touch surface is repeatedly wiped with a handkerchief or the like. The water contact angle after 20,000-times reciprocal cotton wiping is preferably 105° or larger. On the other hand, the water contact angle after 20,000-times reciprocal cotton wiping has especially no upper limit, but from the viewpoint of the finger slidability, about 120° usually suffices.

[II]. A Transparent Resin Laminate According to the Second Embodiment

A transparent resin laminate according to the second embodiment will be described.

The term "sheet" is herein intended to include a film and a plate as well.

Further, the term "resin" is herein intended to include a resin mixture containing two or more resins, and a resin composition containing components other than resins.

The transparent resin laminate according to at least one embodiment has a layer of a hard coat and a layer of a transparent resin sheet in order from the outermost surface layer side. The transparent resin laminate, for the purpose of being used as a material in place of glass, has high transparency and exhibits no coloration. The meaning of the "surface layer side" used here is as described before.

The transparent resin laminate according to at least one embodiment has at least a layer of a hard coat on the surface on the outermost surface layer side of the layer of the transparent resin sheet. The transparent resin laminate according to at least one embodiment may further have a layer of a hard coat also on the other surface of the layer of the transparent resin sheet.

1. An Active Energy Ray-Curable Resin Composition for Forming a Hard Coat Layer

A hard coat on the surface on the outermost surface layer side of the layer of the transparent resin sheet is formed from a coating material including an active energy ray-curable resin composition, and is excellent in scratch resistance and abrasion resistance.

Hereinafter, the coating material including an active energy ray-curable resin composition will be described.

(A) A Polyfunctional (Meth)Acrylate:

An active energy ray-curable resin composition to be used for forming a hard coat of a transparent resin laminate according to the second embodiment includes (A) a polyfunctional (meth)acrylate.

The polyfunctional (meth)acrylate is not especially limited as long as having two or more (meth)acryloyl groups in one molecule thereof, but the similar one as in the active energy ray-curable resin composition according to the first embodiment can be used.

(B) A Compound Having an Alkoxysilyl Group and a (Meth)Acryloyl Group:

The active energy ray-curable resin composition to be used for forming a hard coat of a transparent resin laminate according to the second embodiment includes (B) a compound having an alkoxysilyl group and a (meth)acryloyl group.

The (meth)acryloyl group is herein intended to mean an acryloyl or methacryloyl group. Here, component B is distinguished from component A in that component B has an alkoxysilyl group. A compound of component A has no alkoxysilyl group. In the present description, a compound having an alkoxysilyl group and two or more (meth)acryloyl groups in one molecule thereof is classified into component B.

The compound having an alkoxysilyl group and a (meth)acryloyl group is not especially limited as long as being in the scope of this definition, but the similar one as in the active energy ray-curable resin composition according to the first embodiment can be used. Further, the blend amount of the compound having an alkoxysilyl group and a (meth)acryloyl group may be also controlled similarly to the case of the active energy ray-curable resin composition according to the first embodiment.

(C) An Organotitanium:

The active energy ray-curable resin composition to be used for forming a hard coat of a transparent resin laminate according to the second embodiment includes (C) an organotitanium.

As the organotitanium, the similar one as in the active energy ray-curable resin composition according to the first embodiment can be used. Further, the blend amount of the organotitanium may be also controlled similarly to the case of the active energy ray-curable resin composition according to the first embodiment.

(D) Microparticles Having an Average Particle Diameter of 1 to 300 nm:

The active energy ray-curable resin composition to be used for forming a hard coat of a transparent resin laminate according to the second embodiment includes (D) microparticles having an average particle diameter of 1 to 300 nm.

As the microparticles, the similar type as in the active energy ray-curable resin composition according to the first embodiment can be used. Further the blend amount of the microparticles may be also controlled similarly to the case of the active energy ray-curable resin composition according to the first embodiment.

(E) A Water Repellant:

The active energy ray-curable resin composition to be used for forming a hard coat of a transparent resin laminate according to the second embodiment may further, preferably, include (E) a water repellant from the viewpoint of enhancing the fouling-preventive property and the fouling wiping-off property.

As the water repellant, the similar one as in the active energy ray-curable resin composition according to the first embodiment can be used. Further, the blend amount of the water repellant may be also controlled similarly to the case of the active energy ray-curable resin composition according to the first embodiment.

Further, it is preferable from the viewpoint of improving the curability of the active energy ray-curable resin composition by active energy rays that the resin composition further includes a compound having two or more isocyanate groups (—N=C=O) in one molecule thereof and/or a photopolymerization initiator.

As such a compound having two or more isocyanate groups (—N=C=O) in one molecule thereof, and such a photopolymerization initiator, the similar ones as in the active energy ray-curable resin composition according to the first embodiment can be used.

As required, the active energy ray-curable resin composition may include one or two or more additives such as antistatic agents, surfactants, leveling agents, thixotropy imparting agents, anti-fouling agents, printability improvers, antioxidants, weather resistance stabilizers, light resistance stabilizers, ultraviolet absorbents, thermal stabilizers, colorants and fillers.

As required, the active energy ray-curable resin composition may include a solvent in order to dilute the resin composition to a concentration facilitating coating. The solvent is not especially limited as long as it does not contribute to reacting with components A to D and other optional components or catalyzing (promoting) self-reactions (including deteriorative reactions) of these components. As the solvent, the similar one as in the active energy ray-curable resin composition according to the first embodiment can be used.

The active energy ray-curable resin composition can be obtained by mixing and stirring these components.

2. A Layer of a Hard Coat

A method for forming a hard coat by using a coating material for forming a hard coat including the active energy ray-curable resin composition is not especially limited, and there can be used a known web applying method. The method specifically includes methods such as roll coating, gravure coating, reverse coating, roll brushing, spray coating, air knife coating and die coating.

The thickness of the layer of the hard coat is not especially limited, but may be, from the viewpoint of the scratch resistance and the abrasion resistance of the transparent resin laminate according to at least one embodiment, usually 1 μm or larger, preferably 5 μm or larger, more preferably 10 μm or larger, and still more preferably 20 μm or larger. Further the thickness of the layer of the hard coat may be, from the viewpoint of the cutting processability and the handling properties of the transparent resin laminate according to at least one embodiment, preferably 100 μm or smaller, and more preferably 50 μm or smaller.

3. A Layer of a Transparent Resin Sheet

The layer of the transparent resin sheet is not limited as long as having high transparency and exhibiting no coloration, for the purpose of using the transparent resin laminate according to at least one embodiment as a material in place of glass, and any transparent resin sheet can be used.

Examples of the transparent resin sheet include sheets of cellulose ester resins such as triacetylcellulose; polyester resins such as polyethylene terephthalate; cyclic hydrocarbon resins such as ethylene norbornene copolymers; acrylic resins such as polymethyl methacrylate and polyethyl methacrylate; poly(meth)acrylimide resins; aromatic polycarbonate resins; polyolefin resins such as polypropylene and 4-methyl-pentene-1; polyamide resins; polyarylate resins; polymer-type urethane acrylate resins; polyimide resins; and the like. The transparent resin sheet includes non-stretched sheets, uniaxially stretched sheets and biaxially stretched sheets. The transparent resin sheet further includes laminated sheets of one or two or more thereof.

Preferable examples of the transparent resin sheet include the following:

(α1) a poly(meth)acrylimide resin sheet;
(α2) an acrylic resin sheet;
(α3) an aromatic polycarbonate resin sheet;
(α4) a polyester resin sheet; and (α5) a laminated sheet of one or two or more of the transparent resin sheets α1 to α4.

The (α1) poly(meth)acrylimide resin sheet is a sheet formed of a resin composition containing a poly(meth)acrylimide resin in a major amount. The phrase "in a major amount" for the resin used here means usually 80% by mass or more, and preferably 90% by mass or more.

The poly(meth)acrylimide resin is a thermoplastic resin having features as they are of high transparency, high surface hardness and high rigidity of acrylic resins, having introduced features of being excellent in thermal resistance and dimensional stability of polyimide resins, and being improved in a drawback of coloration from light yellow to reddish brown. A poly(meth)acrylimide resin is disclosed, for example, in JP 2011-519999 A. The term poly(meth)acrylimide is herein intended to mean polyacrylimide or polymethacrylimide.

The poly(meth)acrylimide resin is not limited as long as having high transparency, for the purpose of using the transparent resin laminate as a material in place of glass, and any known poly(meth)acrylimide resin can be used.

Preferable examples of the poly(meth)acrylimide resin include ones having a yellowness index (measured using a chromaticity meter "SolidSpec-3700" (trade name) of Shimadzu Corp. according to JIS K7105:1981) of 3 or lower. The yellowness index of the poly(meth)acrylimide resin is more preferably 2 or lower, and still more preferably 1 or lower.

Further, from the viewpoint of the extrusion load, and the stability of the melted sheet, preferable examples of the poly(meth)acrylimide resin include ones having a melt mass flow rate (measured under the conditions of 260° C. and 98.07 N according to ISO 1133) of 0.1 to 20 g/10 min. The melt mass flow rate of the poly(meth)acrylimide resin is more preferably 0.5 to 10 g/10 min.

Further, the glass transition temperature of the poly(meth)acrylimide resin is preferably 150° C. or higher from the viewpoint of the thermal resistance. The glass transition temperature is more preferably 170° C. or higher.

The poly(meth)acrylimide resin can further contain, as required, other additive(s), within limits not contradictory to the objects of embodiments. The type(s) and blend amount(s) of the optional component(s) are similar to those to be used for the active energy ray-curable resin composition according to the first embodiment.

Commercially available examples of the poly(meth)acrylimide resin include, similarly to one to be used for the active energy ray-curable resin composition according to the first embodiment, "PLEXIMID TT70 (trade name)" of Evonik Degussa GmbH.

The (α2) acrylic resin sheet is a sheet formed of a resin composition containing an acrylic resin such as polymethyl methacrylate or polyethyl methacrylate in a major amount. The phrase "in a major amount" for the resin used here means usually 50% by mass or more, and preferably 60% by mass or more.

Examples of the acrylic resin include resin compositions containing: a mixture of one or two or more of acrylic resins (sometimes hereafter referred to as "Acry") of (meth)acrylate (co)polymers such as polymethyl (meth)acrylate, polyethyl (meth)acrylate, polypropyl (meth)acrylate, polybutyl (meth)acrylate, methyl (meth)acrylate-butyl (meth)acrylate copolymers and ethyl (meth)acrylate-butyl (meth)acrylate copolymers, copolymers including a (meth)acrylate such as ethylene-methyl (meth)acrylate copolymers and styrene-methyl (meth)acrylate copolymers, and the like; and a mixture of one or two or more of core shell rubbers (sometimes hereafter referred to as "Core") of methacrylate-styrene/butadiene rubber graft copolymers, acrylonitrile-styrene/butadiene rubber graft copolymers, acrylonitrile-styrene/ethylene-propylene rubber graft copolymers, acrylonitrile-styrene/acrylate graft copolymers, methacrylate/acrylate rubber graft copolymers, methacrylate-acrylonitrile/acrylaterubber graft copolymers, and the like.

The term (meth)acrylic is herein intended to mean acrylic or methacrylic. Further, the term (co)polymer means a polymer or a copolymer.

The blend ratio between the Acry and the Core referred to in the above is, with the total of the both being taken to be 100 parts by mass, preferably 50 to 85 parts by mass of Acry: 50 to 15 parts by mass of Core, and more preferably 60 to 75 parts by mass of Acry: 40 to 25 parts by mass of Core.

Further, examples of other optional components which can be contained in the acrylic resin composition include thermoplastic resins other than the Acry and the Core; pigments, inorganic fillers, organic fillers, and resin fillers; and additives such as lubricants, antioxidants, weather resistance stabilizers, thermal stabilizers, mold release agents, antistatic agents, nucleating agents and surfactants. The blend amount of the optional component(s) is, with the total of the Acry and the Core being taken to be 100 parts by mass, usually 25 parts by mass or smaller, and preferably about 0.01 to 10 parts by mass.

The (α3) aromatic polycarbonate resin sheet is a sheet formed of a resin composition containing an aromatic polycarbonate resin in a major amount. The phrase "in a major amount" used for the resin here means usually 70% by mass or more, and preferably 90% by mass or more.

As the aromatic polycarbonate resin, there can be used, for example, one or a mixture of two or more of aromatic polycarbonate resins including: polymers obtained by an interfacial polymerization method of an aromatic dihydroxy compound such as bisphenol A, dimethylbisphenol A or 1,1-bis(4-hydroxyphenyl)-3,3,5-trimethylcyclohexane with phosgene; and polymers obtained by a transesterification of an aromatic dihydroxy compound such as bisphenol A, dimethylbisphenol A or 1,1-bis(4-hydroxyphenyl)-3,3,5-trimethylcyclohexane with a carbonate diester such as diphenyl carbonate.

Preferable examples of optional components which can be contained in the aromatic polycarbonate resin include core shell rubbers. With respect to 100 parts by mass of the total amount of the aromatic polycarbonate resin and the core shell rubber, use of the core shell rubber in an amount of 0 to 30 parts by mass (100 to 70 parts by mass of the aromatic polycarbonate resin), preferably 0 to 10 parts by mass (100 to 90 parts by mass of the aromatic polycarbonate resin) can further improve the cutting processability and the impact resistance of the (α3) aromatic polycarbonate resin sheet.

Examples of the core shell rubber include core shell rubbers such as methacrylate-styrene/butadiene rubber graft copolymers, acrylonitrile-styrene/butadiene rubber graft copolymers, acrylonitrile-styrene/ethylene-propylene rubber graft copolymers, acrylonitrile-styrene/acrylate graft copolymers, methacrylate/acrylate rubber graft copolymers and methacrylate-acrylonitrile/acrylate rubber graft copolymers. These core shell rubbers can be used singly or as a mixture of two or more thereof.

The aromatic polycarbonate resin can further contain, as required, thermoplastic resins other than the aromatic polycarbonate resin or the core shell rubber; pigments, inorganic fillers, organic fillers, and resin fillers; and additives such as lubricants, antioxidants, weather resistance stabilizers, thermal stabilizers, mold release agents, antistatic agents and surfactants, within limits not contradictory to the objects of embodiments. The blend amount of these optional components is usually about 0.01 to 10 parts by mass relative to 100 parts by mass of the total amount of the aromatic polycarbonate resin and the core shell rubber.

The (α4) polyester resin sheet is a sheet formed of a resin composition containing a polyester resin such as a polyethylene terephthalate in a major amount. The phrase "in a major amount" used for the resin here means usually 80% by mass or more, and preferably 90% by mass or more. The polyester resin sheet includes non-stretched sheets, uniaxially stretched sheets and biaxially stretched sheets. The polyester resin sheet further includes laminated sheets of one or two or more thereof.

The (α4) polyester resin sheet is preferably a sheet formed of a resin containing a noncrystalline or low-crystalline aromatic polyester resin in a major amount. The phrase "in a major amount" used for the resin here means usually 80% by mass or more, and preferably 90% by mass or more.

Examples of the noncrystalline or low-crystalline aromatic polyester resin include polyester copolymers of an aromatic polyvalent carboxylic acid component such as terephthalic acid, isophthalic acid, orthophthalic acid and naphthalene dicarboxylic acid with a polyhydric alcohol component such as ethylene glycol, diethylene glycol, neopentyl glycol, 1,2-butanediol, 1,3-butanediol, 1,4-butanediol, 1,5-pentanediol, 3-methyl-1,5-pentanediol, 2-methyl-1,3-propanediol and 1,4-cyclohexanedimethanol. The noncrystalline or low-crystalline aromatic polyester resin more specifically includes one or mixtures of two or more of: with the total amount of monomers being taken to be 100% by mol, glycol-modified polyethylene terephthalates (PETG) composed of 50% by mol of terephthalic acid, and 30 to 40% by mol of ethylene glycol and 10 to 20% by mol of 1,4-cyclohexanedimethanol; glycol-modified polycyclohexylenedimethylene terephthalates (PCTG) composed of 50% by mol of terephthalic acid, and 16 to 21% by mol of ethylene glycol and 29 to 34% by mol of 1,4-cyclohexanedimethanol; acid-modified polycyclohexylenedimethylene terephthalates (PCTA) composed of 25 to 49.5% by mol of terephthalic acid and 0.5 to 25% by mol of isophthalic acid, and 50% by mol of 1,4-cyclohexanedimethanol; and acid-modified and glycol-modified polyethylene terephthalates composed of 30 to 45% by mol of terephthalic acid and 5 to 20% by mol of isophthalic acid, and 35 to 48% by mol of ethylene glycol, 2 to 15% by mol of neopentyl glycol, lower than 1% by mol of diethylene glycol and lower than 1% by mol of bisphenol A.

In the present description, a polyester having a heat quantity of melting in a second melting curve of 10 J/g or lower is defined as being noncrystalline; and a polyester having a heat quantity of melting therein of exceeding 10 J/g and 60 J/g or lower, as being low-crystalline, where the second melting curve (i.e., a melting curve measured in the final temperature-rise process) is measured by using a Diamond DSC-type differential scanning calorimeter of PerkinElmer Japan Co., Ltd., and in such a temperature program that a sample is held at 320° C. for 5 min, thereafter cooled at a temperature-fall rate of 20° C./min down to −50° C., held at −50° C. for 5 min and thereafter heated at a temperature-rise rate of 20° C./min up to 320° C.

The polyester resin can contain, as required, other optional component(s), within limits not contradictory to the objects of embodiments. Examples of the optional component(s), which may be contained in the resin, include thermoplastic resins other than the polyester resin; pigments, inorganic fillers, organic fillers, and resin fillers; and additives such as lubricants, antioxidants, weather resistance stabilizers, thermal stabilizers, mold release agents, antistatic agents and surfactants. The blend amount of the optional component(s) is, with respect to 100 parts by mass of the polyester resin, usually 25 parts by mass or smaller, and preferably about 0.01 to 10 parts by mass.

A preferable example of the optional component, which may be contained in the polyester resin, is core shell rubbers. Use of the core shell rubber can improve the impact resistance of the (α4) polyester resin sheet.

Examples of the core shell rubber include one or mixtures of two or more of: core shell rubbers such as methacrylate-styrene/butadiene rubber graft copolymers, acrylonitrile-styrene/butadiene rubber graft copolymers, acrylonitrile-styrene/ethylene-propylene rubber graft copolymers, acrylonitrile-styrene/acrylate graft copolymers, methacrylate/acrylate rubber graft copolymers and methacrylate-acrylonitrile/acrylate rubber graft copolymers. These core shell rubbers can be used singly or as a mixture of two or more thereof.

The blend amount of the core shell rubber is, in order to improve the impact resistance, with respect to 100 parts by mass of the polyester resin, preferably 0.5 parts by mass or larger. On the other hand, in order to hold the transparency, the blend amount of the core shell rubber is preferably 5 parts by mass or smaller, and more preferably 3 parts by mass or smaller.

With respect to the (a5) laminated sheet of one or two or more of the transparent resin sheets a1 to a4, the lamination order is not especially limited, but a laminated sheet is most preferable in which a first poly(meth)acrylimide resin layer; an aromatic polycarbonate resin layer; and a second poly (meth)acrylimide resin layer are directly laminated in this order. In this case, it is preferable from the viewpoint of the curling resistance that the first poly(meth)acrylimide resin layer and the second poly(meth)acrylimide resin layer have substantially the same layer thickness. Further the first poly(meth)acrylimide resin layer and the second poly(meth) acrylimide resin layer may be identical or different, but preferably have the same resin properties, and are more preferably of the same lot of the same grade.

The (a5) laminated sheet of one or two or more of the transparent resin sheets a1 to a4 can be obtained, for example, by carrying out coextrusion film-formation so as to make a desired layer structure by using any type of coextrusion apparatus such as feed block type, multi-manifold type or stack plate type; or by obtaining one or two or more of the transparent resin sheets a1 to a4 by using any type of film-forming apparatus, and thereafter carrying out heat lamination or dry lamination thereof so as to make a desired layer structure; or by obtaining one of the transparent resin sheets a1 to a4 by using any type of film-forming apparatus, and thereafter carrying out extrusion lamination using the sheet as the substrate so as to make a desired layer structure.

A method for producing the transparent resin sheet is not especially limited, but includes, for example, a method including the steps of (P) continuously coextruding a melted sheet of the transparent resin from a T die using an apparatus including an extruder and the T die; and (Q) supplying and charging the melted sheet of the transparent resin between a first rotating or circulating mirror-finished body and a second rotating or circulating mirror-finished body and pressing the melted sheet.

As the T die to be used in the step (P), any known one can be used. Examples of the T die include manifold dies, fish tail dies and coat hanger dies.

As the extruder to be used in the step (P), any known one can be used. Examples of the extruder include single-screw extruders, co-rotating twin-screw extruders and counter-rotating win-screw extruders.

Further, in order to suppress the degradation of the transparent resin, nitrogen purging in the extruder is also one of preferable methods.

Further, the transparent resin is preferably dried before being supplied to film formation. Also, conveying and charging the transparent resin dried in a drier directly from the drier to the extruder is one of preferable methods. Further, it is also preferable that a vacuum vent be installed on the extruder (usually on a measuring zone at a screw tip).

As the first mirror-finished body of the step (Q), there can be used the similar one as in the step (B) or (B') described regarding the first embodiment.

Though there is no intention of being bound by any theory, it can be considered that a transparent resin sheet having excellent transparency, surface smoothness, and appearance is obtained by the film forming method because the melted sheet of the transparent resin is pressed by the first mirror-finished body and the second mirror-finished body, and thus the highly smooth surface states of the first mirror-finished body and the second mirror-finished body are transferred to the sheet to correct faulty portions such as die streaks.

In order that the transfer of the surface states is performed well, the surface temperature of the first mirror-finished body may be preferably 80° C. or higher, more preferably 100° C. or higher. On the other hand, in order to prevent the development on the sheet of appearance faults (exfoliation marks) accompanying the peeling-off from the first mirror-finished body, the surface temperature of the first mirror-finished body may be made to be preferably 200° C. or lower, and more preferably 160° C. or lower.

In order that the transfer of the surface states is performed well, the surface temperature of the second mirror-finished body may be preferably 20° C. or higher, more preferably 60° C. or higher. On the other hand, in order to prevent the development on the sheet of appearance faults (exfoliation marks) accompanying the peeling-off from the second mirror-finished body, the surface temperature of the second mirror-finished body may made to be preferably 200° C. or lower, and more preferably 160° C. or lower.

Here, the surface temperature of the first mirror-finished body is preferably higher than the surface temperature of the second mirror-finished body. This is because the sheet is held by the first mirror-finished body and fed to the next transport roll.

Further, when the hard coat is formed, the hard coat-layer forming surface or both surfaces of the transparent resin sheet serving a substrate may be previously subjected to an easy-adhesion treatment such as a corona discharge treatment or an anchor coat formation in order to enhance the adhesive strength with the hard coat.

The thickness of the transparent resin sheet is not especially limited, and can be any thickness as required. In the case where the transparent resin laminate according to at least one embodiment is used by being laminated further with another substrate such as a polycarbonate plate or an acryl plate, from the viewpoint of the handling properties, the thickness of the transparent resin sheet may be usually 20 µm or larger, and preferably 50 µm or larger. Further, from the viewpoint of the economic efficiency, the thickness of the transparent resin sheet may be usually 250 µm or smaller, and preferably 150 µm or smaller.

In the case where the transparent resin laminate according to at least one embodiment is used as a member in place of window glass of vehicles and window glass of buildings, from the viewpoint of holding the rigidity, the thickness of the transparent resin sheet may be usually 1 mm or larger, preferably 1.5 mm or larger, and still more preferably 2 mm or larger. Further, from the viewpoint f meeting the requirement of weight reduction of the member, the thickness of the transparent resin sheet may be usually 6 mm or smaller, preferably 4 mm or smaller, and still more preferably 3 mm or smaller.

The transparent resin sheet has a total light transmittance of preferably 80% or higher, more preferably 85% or higher and still more preferably 90% or higher as measured according to JIS K7361-1:1997 by using a turbidimeter "NDH2000" (trade name) of Nippon Denshoku Industries Co., Ltd. A higher total light transmittance is preferable.

Further, the transparent resin sheet has a haze of preferably 5% or lower, more preferably 3% or lower and still more preferably 2% or lower as measured according to JIS K7136:2000 by using a turbidimeter "NDH2000" (trade name) of Nippon Denshoku Industries Co., Ltd. A lower haze is preferable.

Further, the transparent resin sheet has a yellowness index of preferably 3 or lower, more preferably 2 or lower and still more preferably 1 or lower as measured according to JIS K7105:1981 by using a chromaticity meter "SolidSpec-3700" (trade name) of Shimadzu Corp. A lower yellowness index is preferable.

4. Preferable Properties of the Transparent Resin Laminate

The transparent resin laminate according to at least one embodiment, for the purpose of being used as a material in place of glass, needs having high transparency and exhibiting no coloration.

For this purpose, as in the transparent resin sheet, the transparent resin laminate according to at least one embodiment may have a total light transmittance of preferably 80% or higher, more preferably 85% or higher and still more preferably 90% or higher as measured according to JIS K7361-1:1997 by using a turbidimeter "NDH2000" (trade name) of Nippon Denshoku Industries Co., Ltd. A higher total light transmittance is preferable.

Further, the transparent resin laminate according to at least one embodiment may have a haze of preferably 5% or lower, more preferably 3% or lower and still more preferably 2% or lower as measured according to JIS K7136:2000 by using a turbidimeter "NDH2000" (trade name) of Nippon Denshoku Industries Co., Ltd. A lower haze is preferable.

Further, the transparent resin laminate according to at least one embodiment may have a yellowness index of preferably 3 or lower, more preferably 2 or lower and still more preferably 1 or lower as measured according to JIS K7105:1981 by using a chromaticity meter "SolidSpec-3700" (trade name) of Shimadzu Corp. A lower yellowness index is preferable.

EXAMPLES

Hereinafter, embodiments will be described by way of Examples, but embodiments are not limited thereto.

Measurement and Evaluation Methods of Physical Properties (1) Total Light Transmittance The total light transmittance was measured according to JIS K7361-1:1997 by using a turbidimeter "NDH2000" (trade name) of Nippon Denshoku Industries Co., Ltd.

(2) Haze

The haze was measured according to JIS K7136:2000 by using a turbidimeter "NDH2000" (trade name) of Nippon Denshoku Industries Co., Ltd.

(3) Yellowness Index (YI)

The yellowness index was measured according to JIS K7105:1981 by using a chromaticity meter "SolidSpec-3700" (trade name) of Shimadzu Corp.

(4) Water Contact Angle

There was measured the water contact angle of the touch-surface-side hard coat surface of a hard coat-laminated film, or the hard coat surface of a transparent resin laminate, by a method of calculating the water contact angle from a width and a height of a water droplet (see JIS R3257:1999) using an automatic contact angle meter "DSA20" (trade name) of KRUSS GmbH.

(5) Abrasion Resistance (Water Contact Angle after Cotton Wiping)

A test piece of a hard coat-laminated film or a transparent resin laminate was prepared in a size of 150 mm length and 50 mm width so that the machine direction of the hard coat-laminated film or the transparent resin laminate corresponded to the longitudinal direction of the test piece, and the test piece was placed on a Gaku shin-type tester in accordance with JIS L0849 so that the touch-surface-side hard coat of the hard coat-laminated film or the hard coat of the transparent resin laminate was on the surface side for the measurement. A stainless steel sheet (10 mm length, 10 mm width, 1 mm thickness) covered with a four-ply gauze (a type 1 medical gauze available from Kawamoto Corporation) was attached to a rubbing finger of the Gakushin-type tester, and the resultant was set so that the sheet face of the stainless steel sheet came into contact with the test piece and a load of 350 g was applied. After 20,000-times reciprocating rubbings of the touch-surface-side hard coat surface of the hard coat-laminated film or the hard coat surface of the transparent resin laminate of the test piece under conditions that the moving distance of the rubbing finger was 60 mm and the speed was 1 cycle/sec, the water contact angle on the cotton-wiped portion was measured in accordance with the method in the (4). In the case where the water contact angle was 100° or more, the abrasion resistance was judged as being good. When the water contact angle after the 20,000-times reciprocation was smaller than 100°, the operations of additionally carrying out 15,000-times and 10,000-times reciprocating rubbings and then measuring the water contact angle on the cotton-wiped portion was repeated, and evaluation was performed by using the following criteria.

⊚ (very good): even after 20,000-times of the reciprocation, the water contact angle was 100° or larger.

○ (good): after 15,000-times of the reciprocation, the water contact angle was 100° or larger, but after 20,000-times of the reciprocation, the water contact angle was smaller than 100°.

Δ (slightly poor): after 10,000-times of the reciprocation, the water contact angle was 100° or larger, but after 15,000-times of the reciprocation, the water contact angle was smaller than 100°.

x (poor): after 10,000-times of the reciprocation, the water contact angle was smaller than 100°.

(6) Finger Slidability

The finger slidability was evaluated according to impressions of whether or not the touch-surface-side hard coat surface of a hard coat laminated film could be desiredly rubbed when being rubbed up and down and right and left or circularly by a forefinger. The test was carried out by 10 test members each, and the case where the test piece could be desiredly rubbed was determined to have scored 2 points; the case where the test piece could be almost desiredly rubbed, 1 point; and the case where the test piece could not be desiredly rubbed including that the finger was caught or otherwise, 0 point, and points of all the test members were totalized and the evaluation was carried out according to the following criteria.

⊚ (very good): 16 to 20 points

Δ (slightly poor): 10 to 15 points x (poor): 0 to 9 points (7) Finger Slidability after Cotton Wiping The test and evaluation were carried out as in the above (6) item of finger slidability except that a hard coat-laminated film after 20,000-times reciprocating cotton wiping was used as the test sample.

(8) Abrasion Resistance

A hard coat laminated film or a transparent resin laminate was placed on a Gakushin-type tester in accordance with JIS L0849 so that the touch-surface-side hard coat of the hard coat-laminated film or the hard coat of the transparent resin laminate was on the surface side for the measurement. A steel wool of #0000 was subsequently attached to a rubbing finger of the Gakushin-type tester and a load of 500 g was then applied. After 100 reciprocating rubbings of the surface of the test piece, the rubbed portion was visually observed. Evaluation was performed by using the following criteria.

Similarly, also the printing-surface-side hard coat of the hard coat-laminated film was tested and evaluated. Here, the evaluation results are shown in Tables as results of touch surface side/results of printing surface side.

⊚ (very good): there were no scratches.

○ (good): there were 1 to 5 scratches.

Δ (slightly poor): there were 6 to 10 scratches.

x (poor): there were 11 or more scratches.

(9) Coefficient of Linear Expansion

The coefficient of linear expansion was measured according to JIS K7197:1991. The measurement used a thermomechanical analyzer (TMA)"EXSTAR6000" (trade name) of Seiko Instruments Inc. The test piece had a size of 20 mm in length and 10 mm in width, and was sampled so that the machine direction (MD) of the film became the longitudinal direction of the test piece. The condition regulation of the test piece was carried out at a temperature of 23° C.±2° C. and a relative humidity of 50±5% for 24 hours. For the purpose of measuring the dimensional stability as a value of a physical property of the film, the condition regulation at the highest temperature in the measurement was not carried out. The interchuck distance was made to be 10 mm; and the temperature program was made to be such that the test piece was held at a temperature of 20° C. for 3 min, and thereafter heated at a temperature-rise rate of 5° C./min up to 270° C. The coefficient of linear expansion was calculated from a temperature-test piece length curve acquired under the condition that the low temperature-side temperature was set at 30° C. and the high temperature-side temperature was set at 250° C.

(10) Minimum Bending Radius

With reference to Bending Formability (B method) in JIS-K6902:2007, a test piece of a hard coat laminated film was conditioned at a temperature of 23° C.±2° C. and a relative humidity of 50±5% for 24 hours, and thereafter the test piece was bent to form a curve at a bending temperature of 23° C.±2° C. at a bending line with a direction perpendicular to the machine direction of the hard coat laminated film so that the touch-surface-side hard coat of the hard coat laminated film was on the outer side, and for the resultant, measurement was performed. The radius of the front face of the shaping jig having the smallest radius of the front face among shaping jigs with no crack generated was defined as the minimum bending radius. The "front face" has the same meaning as the term regarding a shaping jig in the B method defined in Paragraph 18.2 in JIS K6902:2007.

(11) Cutting Processability (Condition of Curved Cutting-Processed Line)

A hard coat laminated film was provided with a cut hole in true circle with a diameter of 0.5 mm and a cut hole in true circle with a diameter of 0.1 mm by using a router processing machine automatically controlled with a computer. The mill used then was a four-bladed super-hard-alloy mill with nicks that has a cylindrically round tip, and the blade diameter was appropriately selected depending on a portion to be processed. Subsequently, the cut hole with a diameter of 0.5 mm was observed for the cut edge surface visually or with a microscope (100×) and evaluation was performed by using the following criteria. Similarly, the cut hole with a diameter of 0.1 mm was observed for the cut edge surface visually or with a microscope (100×) and evaluation was performed by using the following criteria. The result of the former case and the result of the latter case were listed in this order in the tables below.

⊚: (very good): No crack or burr was found even in microscopic observation.
○: (good): No crack was found even in microscopic observation but a burr was found.
Δ: (slightly poor): No crack was found in visual observation but a crack was found in microscopic observation.
x: (poor): A crack was found even in visual observation.

(12) Surface Smoothness (Appearance of Surface)

The surfaces (both surfaces) of a hard coat-laminated film or a transparent resin laminate were visually observed while being irradiated with light from a fluorescent lamp at a variety of angles of incidence, and were evaluated according to the following criteria.

⊚: The surface exhibited no undulations nor flaws, and even when being held up nearby to the light, no impression of cloudiness.
○: When being held up nearby to the light, some portions of the surface exhibited a slight impression of cloudiness.
Δ: When being looked closely into, the surface had a few recognized undulations and flaws. It also gave an impression of cloudiness.

X: The surface had a large number of recognized undulations and flaws, and also gave a definite impression of cloudiness.

(13) Pencil Hardness

The pencil hardness was measured according to JIS K5600-5-4 by using a pencil "UNI" (trade name) of Mitsubishi Pencil Co., Ltd under the condition of a load of 750 g. For the hard coat-laminated film, the measurement results are shown in the tables below as values of touch surface side/values of printing surface side.

(14) Weather Resistance

An accelerated weather resistance test for 2,000 hours was carried out on a test piece by using a weather resistance testing machine of sunshine carbon arc lamp type prescribed in JIS B7753:2007, under the condition indicated in Table 10 of JIS A5759:2008 (provided that the test piece had a size of 125 mm in length and 50 mm in width, and the test piece taken from the transparent resin laminate in such a manner that the machine direction thereof directed to the longitudinal direction of the test piece was used as it was, and was not attached on a glass). The number N of the test was made to be 3; and the cases where there were no appearance changes such as swelling, cracking and exfoliation in the transparent resin laminate in all the tests were determined as passing (i.e., "⊚" in the following tables), and other cases were determined as failure (i.e., "x" in the following tables).

(15) Impact Resistance

The transparent resin laminate was installed and fixed on a rectangular parallelepiped metal-made jig (1,100 mm in length, 900 mm in width, 200 mm in height) being formed of wall faces of a front face plate, a rear face plate and side face plates and having an opened upper part so that the hard coat surface directed upward and completely covered the opened part of the jig. Then, a metal ball of 100 mm in diameter and 4.11 kg in mass was each dropped three times in total from a height of 3,000 mm above the transparent resin laminate to a vertex of a regular triangle of 130 mm in one side marked on the vicinity of the center of a part covering the opened part of the transparent resin laminate. The number N of the test was made to be 3, and the cases where the metal ball did not shoot through the transparent resin laminate in all the tests were determined as passing (i.e., "⊚" in the following tables), and other cases were determined as failure (i.e., "x" in the following tables).

Raw Materials Used (A) Polyfunctional (meth)acrylates:
(A-1) dipentaerythritol hexaacrylate (hexafunctional)
(A-2) ethoxylated trimethylolpropane acrylate (trifunctional)
(B) Compounds having an alkoxysilyl group and a (meth)acryloyl group:
(B-1) "Shin-Etsu Silicone KR-513" (trade name; R: a methoxy group, R': an acryloyl group, R": a methyl group) of Shin-Etsu Chemical Co., Ltd.
(B-2) "Shin-Etsu Silicone X-40-2655A" (trade name; R: a methoxy group, R': a methacryloyl group, R": a methyl group) of Shin-Etsu Chemical Co., Ltd.
(B') Comparative components:
(B'-1) "Shin-Etsu Silicone KBM-403" (trade name; a compound having an alkoxysilyl group and an epoxy group, and no (meth)acryloyl group) of Shin-Etsu Chemical Co., Ltd.
(B'-2) "Shin-Etsu Silicone KBM-903" (trade name; a compound having an alkoxysilyl group and an amino group, and no (meth)acryloyl group) of Shin-Etsu Chemical Co., Ltd.

(C) Organotitaniums:

(C-1) titanium-i-propoxyoctylene glycolate "TOG" (trade name) of Nippon Soda Co., Ltd.

(C-2) tetrakis(2-ethylhexyloxy)titanium "TOT" (trade name)" of Nippon Soda Co., Ltd.

(C-3) di-i-propoxytitanium bis(acetylacetonate) "T-50" (trade name) of Nippon Soda Co., Ltd.

(C') Comparative component:

(C-1) tetra-n-propoxyzirconium "ZAA" (trade name) of Nippon Soda Co., Ltd.

(D) Microparticles having an average particle diameter of 1 to 300 nm:

(D-1) silica microparticles having an average particle diameter of 20 nm (E) Water repellants:

(E-1) an acryloyl group-containing fluoropolyether water repellant "KY-1203" (trade name; solid content: 20% by mass) of Shin-Etsu Chemical Co., Ltd.

(E-2) a methacryloyl group-containing fluoropolyether water repellant "FOMBLIN MT70" (trade name; solid content: 70% by mass) of Solvay Advanced Polymers L.L.C.

(E-3) an acryloyl group-containing fluoropolyether water repellant "Megafac RS-91" (trade name) of DIC Corp.

Other Optional Components:

(F-1) a phenyl ketone photopolymerization initiator (1-hydroxycyclohexyl phenyl ketone) "SB-PI714" (trade name) of Shuang-Bang Ind. Corp.

(F-2) 1-methoxy-2-propanol (F-3) a surface regulator "BYK-399" (trade name) of BYK Japan KK (F-4) a hydroxyketone photopolymerization initiator (α-hydroxyalkylphenone) "Irgacure 127" (trade name) of BASF I. Hard Coat-Laminated Films Using an Active Energy Ray-Curable Resin Composition According to the First Embodiment, and Comparative Examples There were prepared (α-1) a poly(meth)acrylimide "PLEXIMID TT70" (trade name) of Evonik Degussa GmbH as (α) a poly(meth)acrylimide resin, and (β-1) an aromatic polycarbonate "Calibre 301-4" (trade name) of Sumika Styron Polycarbonate Ltd. as (β) an aromatic polycarbonate resin.

Further, there was prepared a coating material (γ-1) as (γ) a coating material for forming a printing-surface-side hard coat, by mixing and stirring a blend composition ratio of 65 parts by mass of the above A-1, 35 parts by mass of the above A-2, 1.4 parts by mass of the above B-1, 0.7 parts by mass of the above C-1, 35 parts by mass of the above D-1, 5.3 parts by mass of the above F-1, 95 parts by mass of the above F-2 and 0.5 parts by mass of the above F-3.

A plurality of kinds of (p) transparent resin films were prepared as follows.

(p-1) a Transparent Resin Film:

A coextrusion film-forming apparatus with a structure illustrated as a conceptual view in FIG. 1 was used; the (α-1) was extruded from an extruder 1 to make both outer layers (an α1 layer and an α2 layer) for a transparent multilayer film and the (β-1) was extruded from an extruder 2 to make a middle layer (a β layer) for the transparent multilayer film; and a melted film 4 for the transparent multilayer film in which the α1 layer, the β layer and the α2 layer were directly laminated in this order was continuously extruded from a coextrusion T die 3 of two-kind three-layer multi-manifold type. The melted film 4 was fed and charged and pressed between a rotating mirror-finished roll 5 and a mirror-finished belt 6 arranged to loop around a pair of belt rollers 7 and circulating between them along the outer peripheral surface of the rotating mirror-finished roll 5 so that the α1 layer directed to the mirror-finished roll 5 side thereby obtaining the transparent multilayer film of 250 μm in total thickness, 80 μm in the α1 layer thickness, 90 μm in the β layer thickness and 80 μm in the α2 layer thickness. The set conditions at this time were such that the drying temperature before the film formation was 150° C. for the (α-1) and 100° C. for (β-1); the set temperatures of the extruder 1 were C1/C2/C3/C4/C5/AD=260/290 to 290° C.; the set temperatures of the extruder 2 were C1/C2/C3/C4/C5/C6/AD=260/280/280/260 to 260/270° C.; either of the extruders 1 and 2 was purged with nitrogen, and used a vacuum vent; the set temperature of the T die 3 was 300° C., and the lip opening was 0.5 mm; the set temperature of the mirror-finished roll 5 was 130° C.; the set temperature of the mirror-finished belt 6 was 120° C., and the pressure of the mirror-finished belt was 1.4 MPa; and the taking-up velocity was 6.5 m/min.

(p-2) a Transparent Resin Film:

By using the (α-1), and by an apparatus equipped with a 50-mm extruder (installed with a W flight screw of L/D=29 and CR=1.86), a T die of 680 mm in die width, and a taking-up machine having a mechanism of pressing a melted film between a mirror-finished roll (i.e., a first mirror-finished body) and a mirror-finished belt (i.e., a second mirror-finished body), a film of 250 μm in thickness was obtained. The set conditions at this time were such that the set temperatures of the extruder were C1/C2/C3/AD=280/300/320/320° C.; the set temperature of the T die was 320° C.; the lip opening of the T die was 0.5 mm; the set temperature of the mirror-finished roll was 140° C.; the set temperature of the mirror-finished belt was 120° C., and the pressure of the mirror-finished belt was 1.4 MPa; and the taking-up velocity was 5.6 m/min.

(p-3) a Transparent Resin Film:

A biaxially-stretched polyethylene terephthalate film "Diafoil" (trade name; thickness: 250 μm) of Mitsubishi Plastics, Inc. was used.

(p-4) a Transparent Resin Film:

An acrylic resin film "Technolloy S001G" (trade name; thickness: 250 μm) of
Sumitomo Chemical Co., Ltd. was used.

(p-5) a Transparent Resin Film:

By using the (β-1), and by an apparatus equipped with a 50-mm extruder (installed with a W flight screw of L/D=29 and CR=1.86), a T die of 680 mm in die width, and a taking-up machine having a mechanism of pressing a melted film between a mirror-finished roll (i.e., a first mirror-finished body) and a mirror-finished belt (i.e., a second mirror-finished body), a film of 250 μm in thickness was obtained. The set conditions at this time were such that the set temperatures of the extruder were C1/C2/C3/AD=280/300/320/320° C.; the set temperature of the T die was 320° C.; the lip opening of the T die was 0.5 mm; the set temperature of the mirror-finished roll was 140° C.; the set temperature of the mirror-finished belt was 120° C., and the pressure of the mirror-finished belt was 1.4 MPa; and the taking-up velocity was 5.6 m/min.

Example 1

A corona discharge treatment was carried out on both surfaces of the p-1 transparent resin film, under the conditions of a treatment amount of 167 W·min/m² (with a discharge power: 500 W, a length of a discharge electrode: 1 m, a line velocity: 3 m/min). Both the surfaces had a wetting index of 64 mN/m. Then, on the surface on the α1 layer side of the transparent resin film, there was applied a coating material of a blend composition (parts by mass) indicated in Table 1 as a coating material for forming a touch-surface-side hard coat so that the thickness after curing became 25 μm by using a die-type coating apparatus; and on the surface of the α2 layer side of the transparent resin film, there was applied the γ-1 as a coating material for forming a printing-surface-side hard coat so that the thickness after curing became 25 μm by using a die-type coating apparatus, by which a hard coat-laminated film was obtained. The above tests (1) to (13) were carried out. The results are shown in Table 1.

Examples 2 to 14 and Comparative Examples 1 to 7

Production and evaluation of physical properties of hard coat-laminated films were carried out totally in the same method as Example 1 except for changing blend compositions of coating materials for forming a touch-surface-side hard coat to those indicated in one of Tables 1 to 4. The results are shown in one of Tables 1 to 4.

Example 15

A corona discharge treatment was carried out on both surfaces of the p-2 transparent resin film, under the conditions of a treatment amount of 167 W·min/m² (with a discharge power: 500 W, a length of a discharge electrode: 1 m, a line velocity: 3 m/min). Both the surfaces had a wetting index of 63 mN/m. Then, on one surface of the transparent resin film, there was applied a coating material of a blend composition indicated in Table 4 as a coating material for forming a touch-surface-side hard coat so that the thickness after curing became 25 μm by using a die-type coating apparatus; and on the other surface of the transparent resin film, there was applied the γ-1 as a coating material for forming a printing-surface-side hard coat so that the thickness after curing became 25 μm by using a die-type coating apparatus, by which a hard coat-laminated film was obtained. The above tests (1) to (13) were carried out. The results are shown in Table 4.

Example 16

On one surface of the p-3 transparent resin film, there was applied a coating material of a blend composition indicated in Table 4 as a coating material for forming a touch-surface-side hard coat so that the thickness after curing became 25 μm by using a die-type coating apparatus; and on the other surface of the film, there was applied the γ-1 as a coating material for forming a printing-surface-side hard coat so that the thickness after curing became 25 μm by using a die-type coating apparatus, by which a hard coat laminate was obtained. The above tests (1) to (13) were carried out. The results are shown in Table 4. Here, any measurement value could not be determined in the test (9) regarding the coefficient of linear expansion because of a large shrinkage of the test piece.

Example 17

Production and evaluation of physical properties of a hard coat-laminated film were carried out totally in the same method as Example 16 except for using the p-4 in place of the p-3 as the transparent resin film. The results are shown in Table 4.

Example 18

Production and evaluation of physical properties of a hard coat-laminated film were carried out totally in the same method as Example 16 except for using the p-5 in place of the p-3 as the transparent resin film. The results are shown in Table 4.

Example 19

Production and evaluation of physical properties of a hard coat-laminated film were carried out totally in the same method as Example 1 except for changing the blend composition of the coating material for forming the touch-surface-side hard coat to that indicated in Table 4. The results are shown in Table 4.

TABLE 1

|  |  | Example 1 | Example 2 | Example 3 | Example 4 | Example 5 | Comparative Example 1 | Comparative Example 2 |
|---|---|---|---|---|---|---|---|---|
| Coating Material for Touch Surface (parts by mass) | A-1 | 65 | 65 | 65 | 65 | 65 | 65 | 65 |
|  | A-2 | 35 | 35 | 35 | 35 | 35 | 35 | 35 |
|  | B-1 | 1.4 | 1.4 | 1.4 | 1.4 | 1.4 | 1.4 | 1.4 |
|  | C-1 | 0.7 | 0.1 | 0.3 | 1.1 | 1.9 | — | 3.5 |
|  | D-1 | 35 | 35 | 35 | 35 | 35 | 35 | 35 |
|  | E-1 | 1.6 | 1.6 | 1.6 | 1.6 | 1.6 | 1.6 | 1.6 |
|  | E-2 | 0.2 | 0.2 | 0.2 | 0.2 | 0.2 | 0.2 | 0.2 |
|  | F-1 | 5.3 | 5.3 | 5.3 | 5.3 | 5.3 | 5.3 | 5.3 |
|  | F-2 | 95 | 95 | 95 | 95 | 95 | 95 | 95 |
| Coating Material for Printing Material |  | γ-1 | γ-1 | γ-1 | γ-1 | γ-1 | γ-1 | γ-1 |
| Transparent Resin Film |  | p-1 | p-1 | p-1 | p-1 | p-1 | p-1 | p-1 |
| Evaluation Results | Total Light Transmittance % | 91 | 91 | 91 | 91 | 91 | 91 | 90 |
|  | Haze % | 0.3 | 0.3 | 0.3 | 0.3 | 0.3 | 0.3 | 0.5 |
|  | Yellowness Index | 0.5 | 0.5 | 0.5 | 0.7 | 2.0 | 0.5 | 4.5 |
|  | Water Contact Angle deg | 110 | 110 | 110 | 110 | 110 | 110 | 110 |
|  | Water Contact Angle after Cotton Wiping deg | 109 | 98 | 102 | 109 | 109 | <90 | 109 |
|  | Water Contact Angle after Cotton Wiping-Evaluation | ◎ | ○ | ◎ | ◎ | ◎ | Δ | ◎ |
|  | Finger Slidability | ◎ | ◎ | ◎ | ◎ | ◎ | ◎ | ◎ |
|  | Finger Slidabilty after Cotton Wiping | ◎ | ○ | ◎ | ◎ | ◎ | X | ◎ |

TABLE 1-continued

|  | Example 1 | Example 2 | Example 3 | Example 4 | Example 5 | Comparative Example 1 | Comparative Example 2 |
|---|---|---|---|---|---|---|---|
| Abrasion resistance | ◎/◎ | ◎/◎ | ◎/◎ | ◎/◎ | ◎/◎ | ◎/◎ | ◎/◎ |
| Coefficient of Linear Expansion ppm | 15 | 15 | 15 | 15 | 15 | 15 | 15 |
| Minimum Bending Radius mm | 25 | 25 | 25 | 25 | 25 | 25 | 25 |
| Cutting Processability | ◎-◎ | ◎-◎ | ◎-◎ | ◎-◎ | ◎-◎ | ◎-◎ | ◎-◎ |
| Surface Smoothness | ◎ | ◎ | ◎ | ◎ | ◎ | ◎ | ◎ |
| Pencil Hardness | 7H/7H | 6H/6H | 7H/7H | 7H/7H | 7H/7H | 6H/6H | 6H/6H |

TABLE 2

|  |  | Example 6 | Example 7 | Example 8 | Example 9 | Comparative Example 3 | Comparative Example 4 |
|---|---|---|---|---|---|---|---|
| Coating Material for Touch Surface (parts by mass) | A-1 | 65 | 65 | 65 | 65 | 65 | 65 |
|  | A-2 | 35 | 35 | 35 | 35 | 35 | 35 |
|  | B-1 | 0.5 | 1.0 | 2.0 | 3.0 | 0.05 | 4.5 |
|  | C-1 | 0.7 | 0.7 | 0.7 | 1.1 | 0.7 | 1.9 |
|  | D-1 | 35 | 35 | 35 | 35 | 35 | 35 |
|  | E-1 | 1.6 | 1.6 | 1.6 | 1.6 | 1.6 | 1.6 |
|  | E-2 | 0.2 | 0.2 | 0.2 | 0.2 | 0.2 | 0.2 |
|  | F-1 | 5.3 | 5.3 | 5.3 | 5.3 | 5.3 | 5.3 |
|  | F-2 | 95 | 95 | 95 | 95 | 95 | 95 |
| Coating Material for Printing Surface |  | γ-1 | γ-1 | γ-1 | γ-1 | γ-1 | γ-1 |
| Transparent Resin Film |  | p-1 | p-1 | p-1 | p-1 | p-1 | p-1 |
| Evaluation Results | Total Light Transmittance % | 91 | 91 | 91 | 91 | 91 | 90 |
|  | Haze % | 0.3 | 0.3 | 0.3 | 0.3 | 0.3 | 0.5 |
|  | Yellowness Index | 0.5 | 0.5 | 0.7 | 1.6 | 0.5 | 2.0 |
|  | Water Contact Angle deg | 110 | 110 | 110 | 110 | 110 | 98 |
|  | Water Contact Angle after Cotton Wiping deg | 100 | 105 | 109 | 109 | <90 | 97 |
|  | Water Contact Angle after Cotton Wiping-Evaluation | ◎ | ◎ | ◎ | ◎ | Δ | X |
|  | Finger Slidability | ◎ | ◎ | ◎ | ◎ | ◎ | ◎ |
|  | Finger Slidability after Cotton Wiping | ◎ | ◎ | ◎ | ◎ | X | ○ |
|  | Abrasion resistance | ◎/◎ | ◎/◎ | ◎/◎ | ◎/◎ | ◎/◎ | ◎/◎ |
|  | Coefficient of Linear Expansion ppm | 15 | 15 | 15 | 15 | 15 | 15 |
|  | Minimum Bending Radius mm | 25 | 25 | 25 | 25 | 25 | 25 |
|  | Cutting Processability | ◎-◎ | ◎-◎ | ◎-◎ | ◎-◎ | ◎-◎ | ◎-◎ |
|  | Surface Smoothness | ◎ | ◎ | ◎ | ◎ | ◎ | ◎ |
|  | Pencil Hardness | 6H/6H | 7H/7H | 7H/7H | 7H/7H | 5H/5H | 7H/7H |

TABLE 3

|  |  | Example 10 | Example 11 | Example 12 | Example 13 | Comparative Example 5 | Comparative Example 6 |
|---|---|---|---|---|---|---|---|
| Coating Material for Touch Surface (parts by mass) | A-1 | 65 | 65 | 65 | 65 | 65 | 65 |
|  | A-2 | 35 | 35 | 35 | 35 | 35 | 35 |
|  | B-1 | 1.4 | 1.4 | — | 1.4 | — | — |
|  | B-2 | — | — | 1.4 | — | — | — |
|  | B'-1 | — | — | — | — | 1.4 | — |
|  | B'-2 | — | — | — | — | — | 1.4 |
|  | C-1 | 0.7 | 0.7 | 0.7 | — | 0.7 | 0.7 |
|  | C-2 | — | — | — | 0.7 | — | — |
|  | D-1 | 10 | 50 | 35 | 35 | 35 | 35 |
|  | E-1 | 1.6 | 1.6 | 1.6 | 1.6 | 1.6 | 1.6 |
|  | E-2 | 0.2 | 0.2 | 0.2 | 0.2 | 0.2 | 0.2 |
|  | F-1 | 5.3 | 5.3 | 5.3 | 5.3 | 5.3 | 5.3 |
|  | F-2 | 95 | 95 | 95 | 95 | 95 | 95 |
| Coating Material for Printing Surface |  | γ-1 | γ-1 | γ-1 | γ-1 | γ-1 | γ-1 |
| Transparent Resin Film |  | p-1 | p-1 | p-1 | p-1 | p-1 | p-1 |

TABLE 3-continued

|  |  | Example 10 | Example 11 | Example 12 | Example 13 | Comparative Example 5 | Comparative Example 6 |
|---|---|---|---|---|---|---|---|
| Evaluation Results | Total Light Transmittance % | 92 | 90 | 91 | 91 | 91 | 91 |
|  | Haze % | 0.3 | 0.5 | 0.3 | 0.3 | 0.3 | 0.3 |
|  | Yellowness Index | 0.5 | 0.6 | 0.5 | 2.0 | 0.7 | 4.4 |
|  | Water Contact Angle deg | 110 | 110 | 110 | 110 | 110 | 110 |
|  | Water Contact Angle after Cotton Wiping deg | 109 | 108 | 100 | 109 | <90 | 105 |
|  | Water Contact Angle after Cotton Wiping-Evaluation | ◎ | ◎ | ◎ | ◎ | Δ | ◎ |
|  | Finger Slidability | ◎ | ◎ | ◎ | ◎ | ◎ | ◎ |
|  | Finger Slidability after Cotton Wiping | ◎ | ◎ | ◎ | ◎ | X | ◎ |
|  | Abrasion resistance | ◎/◎ | ◎/◎ | ◎/◎ | ◎/◎ | ◎/◎ | ◎/◎ |
|  | Coefficient of Linear Expansion ppm | 15 | 15 | 15 | 15 | 15 | 15 |
|  | Minimum Bending Radius mm | 25 | 35 | 25 | 25 | 25 | 25 |
|  | Cutting Processability | ◎-◎ | ◎-◎ | ◎-◎ | ◎-◎ | ◎-◎ | ◎-◎ |
|  | Surface Smoothness | ◎ | ◎ | ◎ | ◎ | ◎ | ◎ |
|  | Pencil Hardness | 6H/6H | 7H/7H | 6H/6H | 7H/7H | 5H/5H | 7H/7H |

TABLE 4

|  |  | Example 14 | Example 15 | Example 16 | Example 17 | Example 18 | Example 19 | Comparative Example 7 |
|---|---|---|---|---|---|---|---|---|
| Coating Material for Touch Surface (parts by mass) | A-1 | 65 | 65 | 65 | 65 | 65 | 65 | 65 |
|  | A-2 | 35 | 35 | 35 | 35 | 35 | 35 | 35 |
|  | B-1 | 1.4 | 1.4 | 1.4 | 1.4 | 1.4 | 1.4 | 1.4 |
|  | C-1 | — | 0.7 | 0.7 | 0.7 | 0.7 | 0.7 | — |
|  | C-3 | 0.7 | — | — | — | — | — | — |
|  | C'-1 | — | — | — | — | — | — | 0.7 |
|  | D-1 | 35 | 35 | 35 | 35 | 35 | 35 | 35 |
|  | E-1 | 1.6 | 1.6 | 1.6 | 1.6 | 1.6 | — | 1.6 |
|  | E-2 | 0.2 | 0.2 | 0.2 | 0.2 | 0.2 | — | 0.2 |
|  | E-3 | — | — | — | — | — | 1.6 | — |
|  | F-1 | 5.3 | 5.3 | 5.3 | 5.3 | 5.3 | 4.6 | 5.3 |
|  | F-2 | 95 | 95 | 95 | 95 | 95 | 95 | 95 |
|  | F-4 | — | — | — | — | — | 0.7 | — |
| Coating Material for Printing Surface |  | γ-1 | γ-1 | γ-1 | γ-1 | γ-1 | γ-1 | γ-1 |
| Transparent Resin Film |  | p-1 | p-2 | p-3 | p-4 | p-5 | p-1 | p-1 |
| Evaluation Results | Total Light Transmittance % | 91 | 91 | 91 | 91 | 91 | 91 | 91 |
|  | Haze % | 0.3 | 0.3 | 0.3 | 0.3 | 0.3 | 0.3 | 0.3 |
|  | Yellowness Index | 2.8 | 0.5 | 0.5 | 0.5 | 0.6 | 0.5 | 0.5 |
|  | Water Contact Angle deg | 110 | 110 | 110 | 110 | 110 | 110 | 110 |
|  | Water Contact Angle after Cotton Wiping deg | 109 | 109 | 109 | 109 | 109 | 109 | <90 |
|  | Water Contact Angle after Cotton Wiping-Evaluation | ◎ | ◎ | ◎ | ◎ | ◎ | ◎ | Δ |
|  | Finger Slidability | ◎ | ◎ | ◎ | ◎ | ◎ | ◎ | ◎ |
|  | Finger Slidability after Cotton Wiping | ◎ | ◎ | ◎ | ◎ | ◎ | ◎ | X |
|  | Abrasion resistance | ◎/◎ | ◎/◎ | ◎/◎ | ◎/◎ | ◎/◎ | ◎/◎ | ◎/◎ |
|  | Coefficient of Linear Expansion ppm | 15 | 12 | Unmeasurable | 70 | 80 | 15 | 15 |
|  | Minimum Bending Radius mm | 25 | 30 | 20 | 25 | 20 | 25 | 25 |
|  | Cutting Processability | ◎-◎ | ◎-◎ | ◎-◎ | ◎-◎ | ◎-◎ | ◎-◎ | ◎-◎ |
|  | Surface Smoothness | ◎ | ◎ | ◎ | ◎ | ◎ | ◎ | ◎ |
|  | Pencil Hardness | 7H/7H | 8H/8H | 4H/4H | 6H/6H | 4H/4H | 7H/7H | 6H/6H |

It has been found that the hard coat-laminated films having the hard coat formed from the coating material containing an active energy ray-curable resin composition according to at least one embodiment were excellent in transparency, color tone, abrasion resistance (cotton wiping resistance and steel wool resistance), surface hardness, bending resistance and surface appearance. By contrast, the hard coat-laminated film of Comparative Example 1, which contained no component C, was inferior in the cotton wiping resistance. The hard coat-laminated film of Comparative Example 2, which contained component C in an amount exceeding the predetermined upper limit, was inferior in the color tone. The hard coat-laminated film of Comparative Example 3, which contained component B in an amount of smaller than the predetermined lower limit, was inferior in the cotton wiping resistance. The hard coat-laminated film of Comparative Example 4, which contained component B in an amount exceeding the predetermined upper limit, hardly developed the water repellency. The hard coat-laminated film of Comparative Example 5, in which a compound having an alkoxysilyl group and an epoxy group and no (meth)acryloyl group was used in place of component B, was inferior in the cotton wiping resistance. The hard coat-laminated film of Comparative Example 6, in which a compound having an alkoxysilyl group and an amino group and no (meth)acryloyl group was used in place of component B, was inferior in the color tone. The hard coat-laminated film of Comparative Example 7, in which tetra-n-propoxyzirconium was used in place of component C, was inferior in the cotton wiping resistance.

II. Transparent Resin Laminates According to the Second Embodiment, and Comparative Examples A plurality of kinds of (a) transparent resin sheets were prepared as follows.

Figure 2:
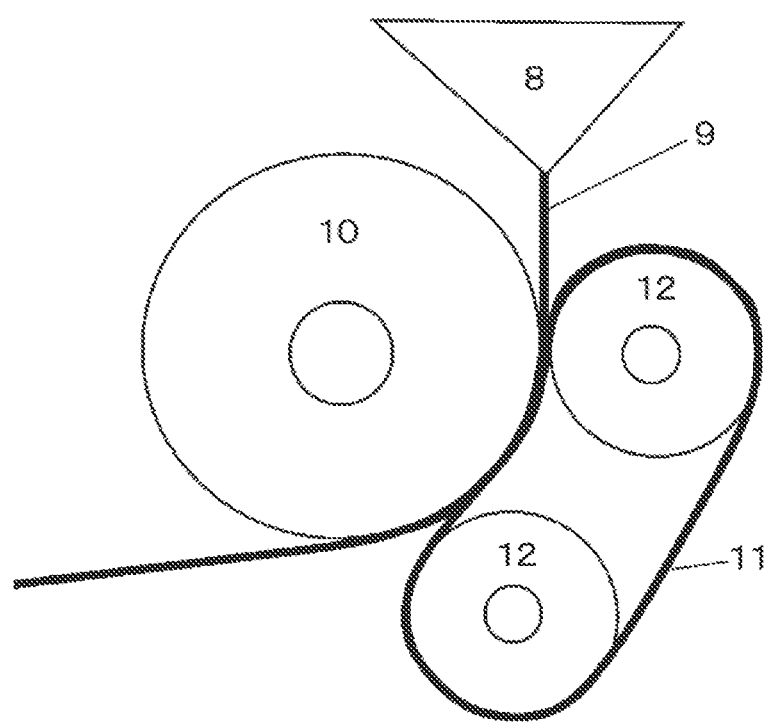
FIG. 2 is a conceptual view of an apparatus used for film formation of a transparent resin sheet in according to examples of various embodiments.

(α1-1) a Poly(Meth)Acrylimide Resin Sheet:

By using the poly(meth)acrylimide resin "PLEXIMID TT70" (trade name) of Evonik Degussa GmbH, and by an apparatus equipped with an extruder and a T die having a structure illustrated as a conceptual view in FIG. 2, a melted sheet 9 of the resin was continuously extruded from the T die 8, and fed and charged and then pressed between a rotating mirror-finished roll 10 and a mirror-finished belt 11 arranged to loop around a pair of belt rollers 12 and circulating between them along the outer peripheral surface of the rotating mirror-finished roll 10, by which a transparent resin sheet of 1 mm in thickness was obtained. The set conditions at this time were such that the set temperature of the first mirror-finished roll was 140° C.; the set temperature of the second mirror-finished roll was 120° C., and the resin temperature at the T die outlet was 300° C.

The obtained transparent resin sheet had a total light transmittance of 92%, a haze of 1.0% and a yellowness index of 0.6.

(α2-1) an Acrylic Resin Sheet:

By using an acrylic resin composition (i.e., a resin composition of 70 parts by mass of an acrylic resin and 30 parts by mass of an acrylic core shell rubber) "HT03Y" (trade name) of Sumitomo Chemical Co., Ltd., and by an apparatus equipped with an extruder and a T die, a melted sheet of the resin was continuously extruded from the T die, and fed and charged and then pressed between a rotating first mirror-finished roll and a rotating second mirror-finished roll thereby obtaining a transparent resin sheet of 1 mm in thickness. The set conditions at this time were such that the set temperature of the first mirror-finished roll was 100° C.; the set temperature of the second mirror-finished roll was 80° C., and the resin temperature at the T die outlet was 300° C. The obtained transparent resin sheet had a total light transmittance of 86%, a haze of 2.7% and a yellowness index of 0.7.

(α3-1) an Aromatic Polycarbonate Resin Sheet:

By using a resin composition of 99.5 parts by mass of an aromatic polycarbonate resin "K-1300Y" (trade name) of Teijin Chemicals Ltd. and 0.5 parts by mass of a core shell rubber (i.e., a methacrylate-styrene/butadiene rubber graft copolymer) "Kane Ace B-56" (trade name) of Kaneka Corp., and by an apparatus equipped with an extruder and a T die, a melted sheet of the resin was continuously extruded from the T die, and fed and charged and then pressed between a rotating first mirror-finished roll and a rotating second mirror-finished roll, by which a transparent resin sheet of 1 mm in thickness was obtained. The set conditions at this time were such that the set temperature of the first mirror-finished roll was 140° C.; the set temperature of the second mirror-finished roll was 120° C., and the resin temperature at the T die outlet was 300° C. The obtained transparent resin sheet had a total light transmittance of 88%, a haze of 2.3% and a yellowness index of 0.8.

(α4-1) a Polyester Resin Sheet:

By using a resin composition of 99 parts by mass of a noncrystalline polyester resin (i.e., a PETG resin) "Cadence GS1" (trade name) of Eastman Chemical Co. and 1 part by mass of a core shell rubber (i.e., a methacrylate-styrene/butadiene rubber graft copolymer) "Kane Ace B-56" (trade name) of Kaneka Corp., and by an apparatus equipped with an extruder and a T die, a melted sheet of the resin was continuously extruded from the T die, and fed and charged and then pressed between a rotating first mirror-finished roll and a rotating second mirror-finished roll, by which a transparent resin sheet of 1 mm in thickness was obtained. The set conditions at this time were such that the set temperature of the first mirror-finished roll was 80° C.; the set temperature of the second mirror-finished roll was 40° C., and the resin temperature at the T die outlet was 200° C. The obtained transparent resin sheet had a total light transmittance of 85%, a haze of 3.0% and a yellowness index of 0.5.

(α5-1) a Laminated Sheet 1:

By using a coextrusion film-forming apparatus of a two-kind three-layer multi-manifold type equipped with an extruder and a T die, a melted laminated sheet having the poly(meth)acrylimide resin "PLEXIMID TT70" (trade name) of Evonik Degussa GmbH as both outer layers thereof and the aromatic polycarbonate "Calibre 301-4" (trade name) of Sumika Styron Polycarbonate Ltd. as a middle layer thereof was continuously extruded from the T die, and fed and charged and then pressed between a rotating first mirror-finished roll and a rotating second mirror-finished roll, by which a transparent resin sheet of 1 mm in total thickness, 0.1 mm in each thickness of the outer layers and 0.8 mm in the middle layer thickness. The set conditions at this time were such that the set temperature of the first mirror-finished roll was 140° C.; the set temperature of the second mirror-finished roll was 120° C., and the resin temperature at the T die outlet was 300° C. The obtained transparent resin sheet had a total light transmittance of 91%, a haze of 1.0% and a yellowness index of 0.7.

Example 20

A corona discharge treatment was carried out on both surfaces of the α1-1 transparent resin sheet, under the conditions of a treatment amount of 167 W·min/m² (with a discharge power: 500 W, a length of a discharge electrode: 1 m, a line velocity: 3 m/min). Both the surfaces had a wetting index of 64 mN/m. Then, on both surfaces of the α1-1 transparent resin sheet, there was applied a coating material of a blend composition (parts by mass) indicated in Table 1 as a coating material for forming a hard coat so that the thickness of the hard coat after curing became 25 μm by using a die-type coating apparatus, by which a transparent resin laminate was obtained. The above tests (1) to (5), (8), and (12) to (15) were carried out. The results are shown in Table 45.

Examples 21 to 33, and Comparative Examples 8 to 14

Production and evaluation of physical properties of transparent resin laminates were carried out totally in the same method as Example 20 except for changing blend compositions of coating materials for forming a hard coat to those indicated in one of Tables 5 to 8. The results are shown in one of Tables 5 to 8. Here, in Comparative Example 11, because the initial water contact angle (in the test (4)) was smaller than 100°, only the measurement of the water contact angle after 20,000-times reciprocation was carried out in the test (5) for the abrasion resistance (water contact angle after cotton wiping).

Example 28-2

Production and evaluation of physical properties of a transparent resin laminate were carried out totally in the same method as Example 1 except for changing the blend composition of a coating material for forming a hard coat to that indicated in Table 2. The results are shown in Table 6.

Example 34

Production and evaluation of physical properties of a transparent resin laminate were carried out totally in the same method as Example 20 except for using the α2-1 in place of the α1-1 as the transparent resin sheet. The results are shown in Table 8.

Example 35

Production and evaluation of physical properties of a transparent resin laminate were carried out totally in the same method as Example 20 except for using the α3-1 in place of the α1-1 as the transparent resin sheet. The results are shown in Table 8.

Example 36

Production and evaluation of physical properties of a transparent resin laminate were carried out totally in the same method as Example 20 except for using the α4-1 in place of the α1-1 as the transparent resin sheet. The results are shown in Table 8.

Example 37

Production and evaluation of physical properties of a transparent resin laminate were carried out totally in the same method as Example 20 except for using the α5-1 in place of the α1-1 as the transparent resin sheet. The results are shown in Table 8.

TABLE 5

| | | Example 20 | Example 21 | Example 22 | Example 23 | Example 24 | Comparative Example 8 | Comparative Example 9 |
|---|---|---|---|---|---|---|---|---|
| Coating | A-1 | 65 | 65 | 65 | 65 | 65 | 65 | 65 |
| Material | A-2 | 35 | 35 | 35 | 35 | 35 | 35 | 35 |
| (parts | B-1 | 1.4 | 1.4 | 1.4 | 1.4 | 1.4 | 1.4 | 1.4 |
| by | C-1 | 0.7 | 0.1 | 0.3 | 1.1 | 1.9 | — | 3.5 |
| mass) | D-1 | 35 | 35 | 35 | 35 | 35 | 35 | 35 |
| | E-1 | 1.6 | 1.6 | 1.6 | 1.6 | 1.6 | 1.6 | 1.6 |
| | E-2 | 0.2 | 0.2 | 0.2 | 0.2 | 0.2 | 0.2 | 0.2 |
| | F-1 | 5.3 | 5.3 | 5.3 | 5.3 | 5.3 | 5.3 | 5.3 |
| | F-2 | 95 | 95 | 95 | 95 | 95 | 95 | 95 |
| Transparent Resin Sheet | | a1-1 | a1-1 | a1-1 | a1-1 | a1-1 | a1-1 | a1-1 |
| Evaluation Results | Total Light Transmittance % | 92 | 91 | 91 | 91 | 91 | 91 | 90 |
| | Haze % | 1.0 | 1.0 | 1.0 | 1.0 | 1.0 | 1.0 | 1.2 |
| | Yellowness Index | 0.6 | 0.6 | 0.6 | 0.7 | 2.0 | 0.6 | 4.5 |
| | Surface Smoothness | ⊚ | ⊚ | ⊚ | ⊚ | ⊚ | ⊚ | ⊚ |
| | Water Contact Angle deg | 110 | 110 | 110 | 110 | 110 | 110 | 110 |
| | Water Contact Angle after Cotton Wiping deg | 109 | 98 | 102 | 109 | 109 | <90 | 109 |
| | Water Contact Angle after Cotton Wiping-Evaluation | ⊚ | ○ | ⊚ | ⊚ | ⊚ | Δ | ⊚ |
| | Abrasion resistance | ⊚ | ⊚ | ⊚ | ⊚ | ⊚ | ⊚ | ⊚ |
| | Weather Resistance | ⊚ | ⊚ | ⊚ | ⊚ | ⊚ | ⊚ | ⊚ |
| | Impact Resistance | ⊚ | ⊚ | ⊚ | ⊚ | ⊚ | ⊚ | ⊚ |
| | Pencil Hardness | 8H | 7H | 8H | 8H | 8H | 7H | 7H |

TABLE 6

| | | Example 25 | Example 26 | Example 27 | Example 28 | Example 28-2 | Comparative Example 10 | Comparative Example 11 |
|---|---|---|---|---|---|---|---|---|
| Coating | A-1 | 65 | 65 | 65 | 65 | 65 | 65 | 65 |
| Material | A-2 | 35 | 35 | 35 | 35 | 35 | 35 | 35 |
| (parts | B-1 | 0.5 | 1.0 | 2.0 | 3.0 | 1.4 | 0.05 | 4.5 |
| by | C-1 | 0.7 | 0.7 | 0.7 | 1.1 | 0.7 | 0.7 | 1.9 |
| mass) | D-1 | 35 | 35 | 35 | 35 | 35 | 35 | 35 |
| | E-1 | 1.6 | 1.6 | 1.6 | 1.6 | — | 1.6 | 1.6 |
| | E-2 | 0.2 | 0.2 | 0.2 | 0.2 | — | 0.2 | 0.2 |
| | E-3 | — | — | — | — | 1.6 | — | — |
| | F-1 | 5.3 | 5.3 | 5.3 | 5.3 | 4.6 | 5.3 | 5.3 |
| | F-2 | 95 | 95 | 95 | 95 | 95 | 95 | 95 |
| | F-3 | — | — | — | — | 0.7 | — | — |
| Transparent Resin Sheet | | a1-1 | a1-1 | a1-1 | a1-1 | a1-1 | a1-1 | a1-1 |

TABLE 6-continued

|  |  | Example 25 | Example 26 | Example 27 | Example 28 | Example 28-2 | Comparative Example 10 | Comparative Example 11 |
|---|---|---|---|---|---|---|---|---|
| Evaluation Results | Total Light Transmittance % | 91 | 91 | 91 | 91 | 92 | 91 | 90 |
|  | Haze % | 1.0 | 1.0 | 1.0 | 1.0 | 1.0 | 1.0 | 1.0 |
|  | Yellowness Index | 0.6 | 0.6 | 0.7 | 1.6 | 0.6 | 0.6 | 2.0 |
|  | Surface Smoothness | ⊚ | ⊚ | ⊚ | ⊚ | ⊚ | ⊚ | ⊚ |
|  | Water Contact Angle deg | 110 | 110 | 110 | 110 | 110 | 110 | 98 |
|  | Water Contact Angle after Cotton Wiping deg | 100 | 105 | 109 | 109 | 109 | <90 | 97 |
|  | Water Contact Angle after Cotton Wiping-Evaluation | ⊚ | ⊚ | ⊚ | ⊚ | ⊚ | Δ | Not Evaluated |
|  | Abrasion resistance | ⊚ | ⊚ | ⊚ | ⊚ | ⊚ | ⊚ | ⊚ |
|  | Weather Resistance | ⊚ | ⊚ | ⊚ | ⊚ | ⊚ | ⊚ | ⊚ |
|  | Impact Resistance | ⊚ | ⊚ | ⊚ | ⊚ | ⊚ | ⊚ | ⊚ |
|  | Pencil Hardness | 7H | 8H | 8H | 8H | 8H | 6H | 8H |

TABLE 7

|  |  | Example 29 | Example 30 | Example 31 | Comparative Example 12 | Comparative Example 13 |
|---|---|---|---|---|---|---|
| Coating Material (parts by mass) | A-1 | 65 | 65 | 65 | 65 | 65 |
|  | A-2 | 35 | 35 | 35 | 35 | 35 |
|  | B-1 | 1.4 | 1.4 | — | — | — |
|  | B-2 | — | — | 1.4 | — | — |
|  | B'-1 | — | — | — | 1.4 | — |
|  | B'-2 | — | — | — | — | 1.4 |
|  | C-1 | 0.7 | 0.7 | 0.7 | 0.7 | 0.7 |
|  | D-1 | 10 | 50 | 35 | 35 | 35 |
|  | E-1 | 1.6 | 1.6 | 1.6 | 1.6 | 1.6 |
|  | E-2 | 0.2 | 0.2 | 0.2 | 0.2 | 0.2 |
|  | F-1 | 5.3 | 5.3 | 5.3 | 5.3 | 5.3 |
|  | E-2 | 95 | 95 | 95 | 95 | 95 |
| Transparent Resin Sheet |  | a1-1 | a1-1 | a1-1 | a1-1 | a1-1 |
| Evaluation Results | Total Light Transmittance % | 91 | 90 | 91 | 91 | 91 |
|  | Haze % | 1.0 | 1.2 | 1.0 | 1.0 | 1.0 |
|  | Yellowness Index | 0.6 | 0.6 | 0.6 | 0.7 | 4.4 |
|  | Surface Smoothness | ⊚ | ⊚ | ⊚ | ⊚ | ⊚ |
|  | Water Contact Angle deg | 110 | 110 | 110 | 110 | 110 |
|  | Water Contact Angle after Cotton Wiping deg | 109 | 108 | 100 | <90 | 105 |
|  | Water Contact Angle after Cotton Wiping-Evaluation | ⊚ | ⊚ | ⊚ | Δ | ⊚ |
|  | Abrasion resistance | ⊚ | ⊚ | ⊚ | ⊚ | ⊚ |
|  | WeatherResistance | ⊚ | ⊚ | ⊚ | ⊚ | ⊚ |
|  | Impact Resistance | ⊚ | ⊚ | ⊚ | ⊚ | ⊚ |
|  | Pencil Hardness | 7H | 8H | 7H | 6H | 8H |

TABLE 8

|  |  | Example 32 | Example 33 | Example 34 | Example 35 | Example 36 | Example 37 | Comparative Example 14 |
|---|---|---|---|---|---|---|---|---|
| Coating Material (parts by mass) | A-1 | 65 | 65 | 65 | 65 | 65 | 65 | 65 |
|  | A-2 | 35 | 35 | 35 | 35 | 35 | 35 | 35 |
|  | B-1 | 1.4 | 1.4 | 1.4 | 1.4 | 1.4 | 1.4 | 1.4 |
|  | C-1 | — | — | 0.7 | 0.7 | 0.7 | 0.7 | — |
|  | C-2 | 0.7 | — | — | — | — | — | — |
|  | C-3 | — | 0.7 | — | — | — | — | — |
|  | C'-1 | — | — | — | — | — | — | 0.7 |
|  | D-1 | 35 | 35 | 35 | 35 | 35 | 35 | 35 |
|  | E-1 | 1.6 | 1.6 | 1.6 | 1.6 | 1.6 | 1.6 | 1.6 |

TABLE 8-continued

|  |  | Example 32 | Example 33 | Example 34 | Example 35 | Example 36 | Example 37 | Comparative Example 14 |
|---|---|---|---|---|---|---|---|---|
| | E-2 | 0.2 | 0.2 | 0.2 | 0.2 | 0.2 | 0.2 | 0.2 |
| | F-1 | 5.3 | 5.3 | 5.3 | 5.3 | 5.3 | 5.3 | 5.3 |
| | F-2 | 95 | 95 | 95 | 95 | 95 | 95 | 95 |
| | Transparent Resin Sheet | a1-1 | a1-1 | a2-1 | a3-1 | a4-1 | a5-1 | a1-1 |
| Evaluation Results | Total Light Transmittance % | 91 | 91 | 86 | 88 | 85 | 91 | 91 |
| | Haze % | 1.0 | 1.0 | 2.7 | 2.3 | 3.0 | 1.0 | 1.0 |
| | Yellowness index | 2.0 | 2.8 | 0.7 | 0.8 | 0.5 | 0.7 | 0.6 |
| | Surface Smoothness | ◎ | ◎ | ◎ | ◎ | ◎ | ◎ | ◎ |
| | Water Contact Angle deg | 110 | 110 | 110 | 110 | 110 | 110 | 110 |
| | Water Contact Angle after Cotton Wiping deg | 109 | 109 | 109 | 109 | 109 | 109 | <90 |
| | Water Contact Angle after Cotton Wiping-Evaluation | ◎ | ◎ | ◎ | ◎ | ◎ | ◎ | Δ |
| | Abrasion resistance | ◎ | ◎ | ◎ | ◎ | ◎ | ◎ | ◎ |
| | Weather Resistance | ◎ | ◎ | ◎ | ◎ | ◎ | ◎ | ◎ |
| | Impact Resistance | ◎ | ◎ | ◎ | ◎ | ◎ | ◎ | ◎ |
| | Pencil Hardness | 8H | 8H | 5H | 4H | 3H | 7H | 7H |

It has been found that the transparent resin laminates according to at least one embodiment developed physical properties suitable as materials in place of glass. Further, the transparent resin laminates of Examples 20 to 33 and 37, which used the poly(meth)acrylimide resin sheet as their transparent resin sheet, were especially excellent in the transparency. By contrast, the transparent resin laminate of Comparative Example 1, which contained no component C, was inferior in the cotton wiping resistance. The transparent resin laminate of Comparative Example 2, which contained component C in an amount exceeding the predetermined upper limit, was inferior in the color tone. The transparent resin laminate of Comparative Example 3, which contained component B in an amount of smaller than the predetermined lower limit, was inferior in the cotton wiping resistance. The transparent resin laminate of Comparative Example 4, which contained component B in an amount exceeding the predetermined upper limit, hardly developed the water repellency. The transparent resin laminate of Comparative Example 5, in which a compound having an alkoxysilyl group and an epoxy group and no (meth)acryloyl group was used in place of component B, was inferior in the cotton wiping resistance. The transparent resin laminate of Comparative Example 6, in which a compound having an alkoxysilyl group and an amino group and no (meth)acryloyl group was used in place of component B, was inferior in the color tone. The transparent resin laminate of Comparative Example 7, in which tetra-n-propoxyzirconium was used in place of component C, was inferior in the cotton wiping resistance.

INDUSTRIAL APPLICABILITY

The hard coat-laminated film having a hard coat formed from a coating material containing the active energy ray-curable resin composition according to the first embodiment, since being excellent in the above various properties, can be used suitably as members for image display apparatuses (including image display apparatuses having a touch panel function and image display apparatuses having no touch panel function) such as liquid crystal displays, plasma displays and electroluminescence displays, particularly as display face plates of touch panels.

Further the transparent resin laminate according to the second embodiment, since being excellent in the above various properties, can be used suitably as members for windows and windshields of vehicles, windows and doors of buildings, protecting plates of electronic signboards, surface members for household appliances such as refrigerators, doors of furniture such as cupboards, show windows, and the like.

REFERENCE SIGNS LIST

1: Extruder 1
2: Extruder 2
3: Coextrusion T die of two-kind three-layer multi-manifold type
4: Melted film
5: Mirror-finished roll
6: Mirror-finished belt
7: A pair of belt rollers
8: T die
9: Melted sheet
10: Mirror-finished roll
11: Mirror-finished belt
12: A pair of belt roller

The invention claimed is:
1. A hard coat-laminated film for a touch panel display face plate, the hard coat-laminated film comprising:
a transparent resin film; and
a hard coat formed on at least one surface of the transparent resin film from a coating material comprising an active energy ray-curable resin composition,
wherein a thickness of the hard coat is larger than 10 μm, and
wherein the hard coat-laminated film meets the following requirements (1-i) to (1-v):
(1-i) a total light transmittance of 80% or higher;
(1-ii) a haze of 3.0% or lower;
(1-iii) a yellowness index of 3 or lower;
(1-iv) a water contact angle of a touch surface of the hard coat of 100° or larger; and
(1-v) a water contact angle of the touch surface of the hard coat of 100° or larger after 20,000-times reciprocal cotton wiping of the touch panel.

2. The hard coat-laminated film according to claim 1, wherein the transparent resin film is a poly(meth)acrylimide resin film.

3. The hard coat-laminated film according to claim 2, wherein the poly(meth)acrylimide resin film is a transparent multilayer film comprising:
   a first poly(meth)acrylimide resin layer ($\alpha$1);
   an aromatic polycarbonate resin layer ($\beta$); and
   a second poly(meth)acrylimide resin layer ($\alpha$2),
   directly laminated in this order.

4. The hard coat-laminated film according to claim 1, wherein a pencil hardness of the touch surface of the hard coat is 4H or higher.

5. An image display apparatus member, comprising the hard coat-laminated film according claim 1.

6. A transparent resin laminate, comprising a layer of a hard coat and a layer of a poly(meth)acrylimide resin sheet in order from the outermost surface layer side, wherein a thickness of the hard coat is larger than 10 μm, and wherein the transparent resin laminate meets the following properties (2-i) to (2-v):
   (2-i) a total light transmittance of 80% or higher;
   (2-ii) a haze of 5% or lower;
   (2-iii) a yellowness index of 3 or lower;
   (2-iv) a water contact angle of the hard coat surface of 100° or larger; and
   (2-v) a water contact angle of the hard coat surface of 100° or larger after 20,000-times reciprocal cotton wiping of the hard coat surface.

7. The transparent resin laminate according to claim 6, wherein the poly(meth)acrylimide resin sheet is a laminated sheet comprising:
   a first poly(meth)acrylimide resin layer;
   an aromatic polycarbonate resin layer; and
   a second poly(meth)acrylimide resin layer,
   directly laminated in this order.

8. The transparent resin laminate according to claim 6, wherein a pencil hardness of the hard coat surface is 7H or higher.

9. A vehicle member comprising the transparent resin laminate according to claim 6.

10. A building member comprising the transparent resin laminate according to claim 6.

11. The hard coat-laminated film according to claim 1, wherein a thickness of the hard coat is 20 μm or larger.

12. The hard coat-laminated film according to claim 6, wherein a thickness of the hard coat is 20 μm or larger.

* * * * *